(12) United States Patent
Machida

(10) Patent No.: US 7,743,374 B2
(45) Date of Patent: Jun. 22, 2010

(54) NETWORK SYSTEM, INFORMATION PROCESSING APPARATUS, INFORMATION PROCESSING METHOD, AND CONTROL PROGRAM FOR REMOTE DRIVER INSTALLATION

(75) Inventor: Haruo Machida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1142 days.

(21) Appl. No.: 10/022,375

(22) Filed: Dec. 20, 2001

(65) Prior Publication Data

US 2002/0083431 A1 Jun. 27, 2002

(30) Foreign Application Priority Data

Dec. 21, 2000 (JP) ............................. 2000-389455
Oct. 31, 2001 (JP) ............................. 2001-334705

(51) Int. Cl.
*G06F 9/44* (2006.01)
*G06F 9/445* (2006.01)

(52) U.S. Cl. ................. 717/176; 717/174; 717/177; 717/178; 717/171; 717/172; 717/173

(58) Field of Classification Search .......... 717/168–178
See application file for complete search history.

(56) References Cited

U.S. PATENT DOCUMENTS

| | | | | |
|---|---|---|---|---|
| 5,580,177 | A * | 12/1996 | Gase et al. ..................... 400/61 |
| 5,699,494 | A * | 12/1997 | Colbert et al. ............. 358/1.15 |
| 5,727,135 | A * | 3/1998 | Webb et al. ................ 358/1.14 |
| 5,828,864 | A * | 10/1998 | Danknick et al. ............. 703/24 |
| 6,173,320 | B1 * | 1/2001 | Cunningham ............... 709/220 |
| 6,467,087 | B1 * | 10/2002 | Yang .......................... 717/168 |
| 6,513,159 | B1 * | 1/2003 | Dodson ...................... 717/178 |
| 6,570,667 | B1 * | 5/2003 | Hattori et al. ............. 358/1.15 |
| 6,681,392 | B1 * | 1/2004 | Henry et al. ................. 717/176 |
| 6,721,879 | B1 * | 4/2004 | Tanaka .......................... 713/1 |
| 6,728,787 | B1 * | 4/2004 | Leigh .......................... 719/327 |
| 7,023,566 | B2 * | 4/2006 | Yegnanarayanan .......... 358/1.1 |

(Continued)

FOREIGN PATENT DOCUMENTS

JP A 07-121323 5/1995

(Continued)

OTHER PUBLICATIONS

Montello,"Printing through the Novell Network," Lawrence Berkeley National Laboratory, May 1999.*

(Continued)

*Primary Examiner*—Insun Kang
(74) *Attorney, Agent, or Firm*—Fitzpatrick, Cella, Harper & Scinto

(57) ABSTRACT

There is a problem of making it possible to set up a driver with a simple operation when a driver for a peripheral device on the network is not installed. When a driver setup instruction is given, an instruction is sent to the specified PC to perform an operation to set up the driver specified by the user, and the information processing unit performs the operation to set up the driver based on the instruction. For example, when the peripheral device is a printer, the information processing unit determines whether or not the setup operation has been completed normally, and if the driver has been correctly installed, test printing is executed.

9 Claims, 32 Drawing Sheets

U.S. PATENT DOCUMENTS

| | | | |
|---|---|---|---|
| 7,065,769 B1* | 6/2006 | Tolopka | 719/321 |
| 2001/0052112 A1* | 12/2001 | Mohan et al. | 717/1 |
| 2002/0051169 A1* | 5/2002 | Nishikawa | 358/1.15 |
| 2002/0073415 A1* | 6/2002 | Kim et al. | 717/173 |

FOREIGN PATENT DOCUMENTS

| | | |
|---|---|---|
| JP | 10-049317 A | 2/1998 |
| JP | A 10-171634 | 6/1998 |
| JP | A 11-102287 | 4/1999 |
| JP | A 2000-003262 | 1/2000 |
| JP | A 2000-215128 | 8/2000 |
| JP | A 2001-230892 | 8/2001 |

OTHER PUBLICATIONS

Eckstein et al., Using Samba, O'Reily, Nov. 1999.*
SmartComputng, "Laser Printers," Aug. 1999.*
Dular et al., "Printing Services in NT and Unix," Jul. 1999.*
Wilson, "Setting Up Network Printing with Client 32 for Windows 95," Nov. 1996.*
Asano, Kazunori, "Sharing Printers on Network", Network Construction with Win, Mac & Linux from $100, pp. 50-56, Sep. 23, 1999 (and English translation thereof).

* cited by examiner

FIG. 3

| PC NAME | | SNPC00 |
|---|---|---|
| IP ADDRESS | | 100.100.100.1 |
| OS TYPE | | Windows98 |
| USER NAME | | suzuki |
| NUMBER OF DRIVERS | | N |
| 1 | DEVICE TYPE | PRINTER |
| | DRIVER NAME | Printer 2000 |
| | VERSION INFORMATION | 1.00.00 |
| | OUTPUT PORT | LOCAL |
| | SHARED INFORMATION | ON |
| 2 | DEVICE TYPE | SCANNER |
| | DRIVER NAME | Scanner 2000 |
| | VERSION INFORMATION | 1.00.00 |
| | OUTPUT PORT | LOCAL |
| | SHARED INFORMATION | ON |
| | ⋮ | |
| N | DEVICE TYPE | PRINTER |
| | DRIVER NAME | Printer 2001 |
| | VERSION INFORMATION | 1.00.00 |
| | OUTPUT PORT | NETWORK |
| | SHARED INFORMATION | OFF |

FIG. 8

| DEVICE TYPE | PRINTER |
|---|---|
| DRIVER NAME | Printer 2000 |
| VERSION INFORMATION | 1.00.00 |
| OUTPUT PORT | ¥¥snpcw2¥Prn2000 |
| SETUP INFORMATION | 0 |

FIG. 9

PRINTING TEST OF PRINTER

Installing of printer 2000 is complete. The PC name, printer driver, and port configuration are as folloews:

| | |
|---|---|
| DATE: | JUNE 12, 2000 |
| PC NAME: | SNPC01 |
| DRIVER NAME: | Printer2000 |
| VERSION: | 1.00.00 |
| OUTPUT PORT: | ¥¥SNPCW2¥Prn2000 |

FIG. 11

| PC NAME | | SNPC00 |
|---|---|---|
| IP ADDRESS | | 100.100.100.1 |
| OS TYPE | | Windows98 |
| USER NAME | | suzuki |
| NUMBER OF DRIVERS | | 8 |
| 1 | DEVICE TYPE | PRINTER |
| | DRIVER NAME | LASER-830 |
| | VERSION INFORMATION | 1.00.00 |
| | OUTPUT PORT | LOCAL |
| | SHARED INFORMATION | ON |
| 2 | DEVICE TYPE | PRINTER |
| | DRIVER NAME | LASER-2160 |
| | VERSION INFORMATION | 1.00.00 |
| | OUTPUT PORT | LOCAL |
| | SHARED INFORMATION | OFF |
| 3 | DEVICE TYPE | PRINTER |
| | DRIVER NAME | Scanner-2000 |
| | VERSION INFORMATION | 1.00.00 |
| | OUTPUT PORT | 100.100.100.123 |
| | SHARED INFORMATION | OFF |
| 4 | DEVICE TYPE | PRINTER |
| | DRIVER NAME | INKJET-10V |
| | VERSION INFORMATION | 1.00.00 |
| | OUTPUT PORT | ¥¥NOTEPC01¥INKJET10V |
| | SHARED INFORMATION | OFF |
| | ⋮ | |
| 7 | DEVICE TYPE | SCANNER |
| | DRIVER NAME | Scan-300 |
| | VERSION INFORMATION | 1.00.00 |
| | OUTPUT PORT | LOCAL |
| | SHARED INFORMATION | OFF |
| 8 | DEVICE TYPE | SCANNER |
| | DRIVER NAME | Scan-FB620 |
| | VERSION INFORMATION | 1.00.00 |
| | OUTPUT PORT | ¥¥snpc01¥FB620 |
| | SHARED INFORMATION | OFF |

FIG. 14

DRIVER CHECK

Connection status of the devices and the installed drivers will be checked and unnecessary drivers will be deleted. To execute, select devices to be checked and select button [OK]. To cancel, select button [CANCEL].

DEVICE TYPE(D)
- ☐ PRINTER
- ☐ SCANNER
- ☐ FAX

☐ DISPLAY CONFIRMATION MESSAGE

[ OK ]   [ CANCEL ]

FIG. 15

SETTING OF DRIVER DELETE PROTECTION

Set drivers on which driver deletion is not automatically performed.

PROTECTED DRIVERS(R):

[            ]   [REFERENCE(S)]   [ADDITION(A)]

PROTECTED DRIVER LIST(L)
¥¥snpc01¥INKJET-440J   [DELETE(R)]

[ OK ]   [ CANCEL ]

| DEVICE TYPE | PRINTER |
| --- | --- |
| DEVICE NAME | Printer 2000 |
| VERSION INFORMATION | 1.00.00 |
| OUTPUT PORT | ¥¥snpcw2¥Prn2000 |

FIG. 21

| PC NAME | | SNPC00 |
|---|---|---|
| IP ADDRESS | | 100.100.100.1 |
| OS TYPE | | Windows98 |
| USER NAME | | suzuki |
| NUMBER OF DRIVERS | | 8 |
| 1 | DEVICE TYPE | PRINTER |
| | DRIVER NAME | LASER-830 |
| | VERSION INFORMATION | 1.00.00 |
| | OUTPUT PORT | LOCAL |
| | SHARED NAME | LASER-830 |
| | DRIVER INFORMATION ADDRESS | 0x10000 |
| 2 | DEVICE TYPE | PRINTER |
| | DRIVER NAME | LASER-2160 |
| | VERSION INFORMATION | 1.00.00 |
| | OUTPUT PORT | LOCAL |
| | SHARED NAME | 0 |
| | DRIVER INFORMATION ADDRESS | 0x20000 |
| 3 | DEVICE TYPE | PRINTER |
| | DRIVER NAME | INKJET-10V |
| | VERSION INFORMATION | 1.00.00 |
| | OUTPUT PORT | ¥¥NOTEPC01¥INKJET-10V |
| | SHARED NAME | INKJET-10V |
| | DRIVER INFORMATION ADDRESS | 0x30000 |
| ⋮ | | |
| 8 | DEVICE TYPE | SCANNER |
| | DRIVER NAME | Scan-BF620 |
| | VERSION INFORMATION | 1.00.00 |
| | OUTPUT PORT | ¥¥snpc01¥FB620 |
| | SHARED NAME | BF620 |
| | DRIVER INFORMATION ADDRESS | 0x40000 |
| DRIVER INFORMATION | | |

FIG. 23

DRIVER VERSION CHECK SETTING  ✕

Set the URL for performing the driver version check.

URL(U): http://www.abc.co.jp/  ▼

[ OK ]  [ CANCEL ]

FIG. 24

| DEVICE TYPE | PRINTER | |
|---|---|---|
| DEVICE NAME | LASER-830 | |
| NUMBER OF VERSION INFORMATION | N | |
| 1 | VERSION INFORMATION | 1.00.00 |
| | DRIVER INFORMATION ADDRESS | 0x10000 |
| 2 | VERSION INFORMATION | 1.20.00 |
| | DRIVER INFORMATION ADDRESS | 0x20000 |
| | ⋮ | |
| N | VERSION INFORMATION | 3.10.00 |
| | DRIVER INFORMATION ADDRESS | 0x80000 |
| DRIVER INFORMATION | | |

| DEVICE TYPE | PRINTER |
|---|---|
| DRIVER NAME | Printer 2000 |
| VERSION INFORMATION | 1.20.00 |
| OUTPUT PORT | ¥¥snpcw2¥Prn2000 |

NETWORK SYSTEM, INFORMATION PROCESSING APPARATUS, INFORMATION PROCESSING METHOD, AND CONTROL PROGRAM FOR REMOTE DRIVER INSTALLATION

BACKGROUND OF THE INVENTION

1. Field of the Invention

The present invention relates to a network system, an information processing unit, an information processing method, and a control program, and relates to those for displaying and managing information processing units and peripheral devices shared on a network.

2. Related Background Art

In recent years, with the spread of personal computers (hereafter referred to as PCs), printers, scanners, digital cameras, and the like, networks such as LAN are coming to be used widely. Thus, needs for sharing a printer, a modem, a scanner, and the like on a network are also growing. Also, numerous drivers for using those peripheral devices, as well as their installing methods have been provided.

One installing method is to perform installing or version upgrading of a driver on a client unit based on an instruction from the client unit, the printer driver being stored in a specific directory of a server unit connected to the client unit via a network. Also, there is a technique in which a driver is downloaded by a pull from a client unit, which having been notified of updating of the driver stored in predetermined server unit, by the client requesting the driver in the server unit to be sent.

Though this is not about distribution of drivers, in the field of data distribution, a technique is also known in which data distribution is performed by a push without waiting for a request from a client unit when there is updating of data on a data distribution server unit.

In order to make peripheral devices available it is necessary to install drivers corresponding to respective devices. For example, in newly making a device available for a client unit, it is necessary to newly add a driver. Also, when a driver is already installed, there is an issue of how to perform version upgrading of the driver.

There is also a problem that it is difficult to determine whether the driver has actually been set up normally upon the completion of its installing or version upgrading.

Furthermore, procedures for installing drivers, upgrading their versions, and setting them up are different from driver to driver. It is also necessary to select a driver type according to the environment for the device and the client unit, complicating the operation. According to the prior art, there is a problem that the working efficiency is very low as it is necessary to perform complicated work on the side of client setting up drivers, such as adding and modifying of drivers based on instructions from the client unit.

Furthermore, in recent years, as network systems are expanding in scale, there are more occasions to set up drivers, installing them or upgrading their versions on a plurality of client units on a unit basis. There is a problem that workload becomes heavier if complicated procedures are to be performed for installing drivers, upgrading their versions, or setting them up on client units.

SUMMARY OF THE INVENTION

The present invention has been devised in view of such problems. In an embodiment of the invention, the object is to provide a scheme that alleviates the workload in setting up information, allowing driver information for a client unit to be set up with a simple operation.

A further object is to provide a scheme in a printing system comprising a plurality of client units for accomplishing driver install operations in accordance with the setup status of each client unit on which a driver is to be installed so that the user of each unit can perform the install operation without paying attention to the setup status of the driver.

A further object is to provide a scheme for performing driver set up by carrying out push install from the server unit onto the client unit without waiting for a request from the client unit so that a complicated install operation would not be required at the client unit.

A further object is to provide a scheme for executing test printing after the completion of driver information install in order to check if the setup of driver information has been completed normally.

When the problems described above are solved according to the invention, a further problem arises, which is as follows; the workload is heavy for checking the operation of each client unit to see whether or not driver information has been set up on a plurality of client units correctly after installing a driver on the client units at a time by push install. Therefore, in one of the embodiments of the invention, a further object is to have the test printing executed in conjunction with the push install of driver information from the server unit onto the plurality of client units after giving a setup instruction so that the peripheral device can be checked to see whether or not it has been set up correctly.

In order to achieve at least one of the above described objects, in the embodiments of the invention, the following configuration will be disclosed.

For example, an information processing unit in communication with client units is disclosed, the information processing unit comprising unit managing means for managing at the client units the setup status of the driver for a peripheral device connected to the client units, and transmission controlling means for controlling operations to send a plurality of client units driver information corresponding to the client units based on the setup status.

In addition, an information processing unit in communication with a plurality of client units is disclosed, the information processing unit comprising determining means for determining a plurality of client units on which driver information is to be installed, and transmission controlling means for controlling distribution of driver information that controls a peripheral device connected to the client units to the plurality of clients determined by the determining means.

In addition, an information processing unit in communication with a peripheral device and a server unit is disclosed, the information processing unit comprising recognizing means for recognizing a setup instruction and driver information from the server unit, and program managing means for installing on the client units driver information for controlling the peripheral device in response to recognizing the setup instruction without requesting the server unit for a setup instruction.

In addition, an information processing unit in communication with a server unit and a peripheral device is disclosed, the information processing unit comprising program managing means for setting up a driver based on a setup instruction for the driver of the peripheral device from the server unit, and causing generation of an instruction to have the peripheral unit execute test printing to check if the setup has been completed normally.

In addition, an information processing unit in communication with client units is disclosed, the information processing unit comprising determining means for determining client units on which a driver is to be set up, and transmission controlling means for controlling operations to send the client units an instruction to set up a driver for said client units as well as an instruction to have the client units execute test printing to check if the driver setup for the client units has been completed normally.

Other features and advantages of the present invention will be apparent from the following description taken in conjunction with the accompanying drawings, in which like reference characters designate the same or similar parts throughout thereof.

BRIEF DESCRIPTION OF THE DRAWINGS

FIG. 3 shows an exemplary driver information structure;

FIG. 8 shows an exemplary driver setup instruction structure;

FIG. 9 shows an exemplary driver setup check printing;

FIG. 11 shows an exemplary driver information structure;

FIG. 14 shows an exemplary screen for selecting devices to be checked;

FIG. 15 shows an exemplary screen for setting delete protection for a driver;

FIG. 21 is en exemplary driver information structure;

FIG. 23 shows an exemplary screen for making settings for driver version checking;

FIG. 24 shows an exemplary structure in which a version is managed for each driver;

DESCRIPTION OF THE PREFERRED EMBODIMENTS

In the following, embodiments of a network system, an information processing unit, an information processing method, a control program, and a computer readable medium will be described with reference to the drawings.

Figure 1:
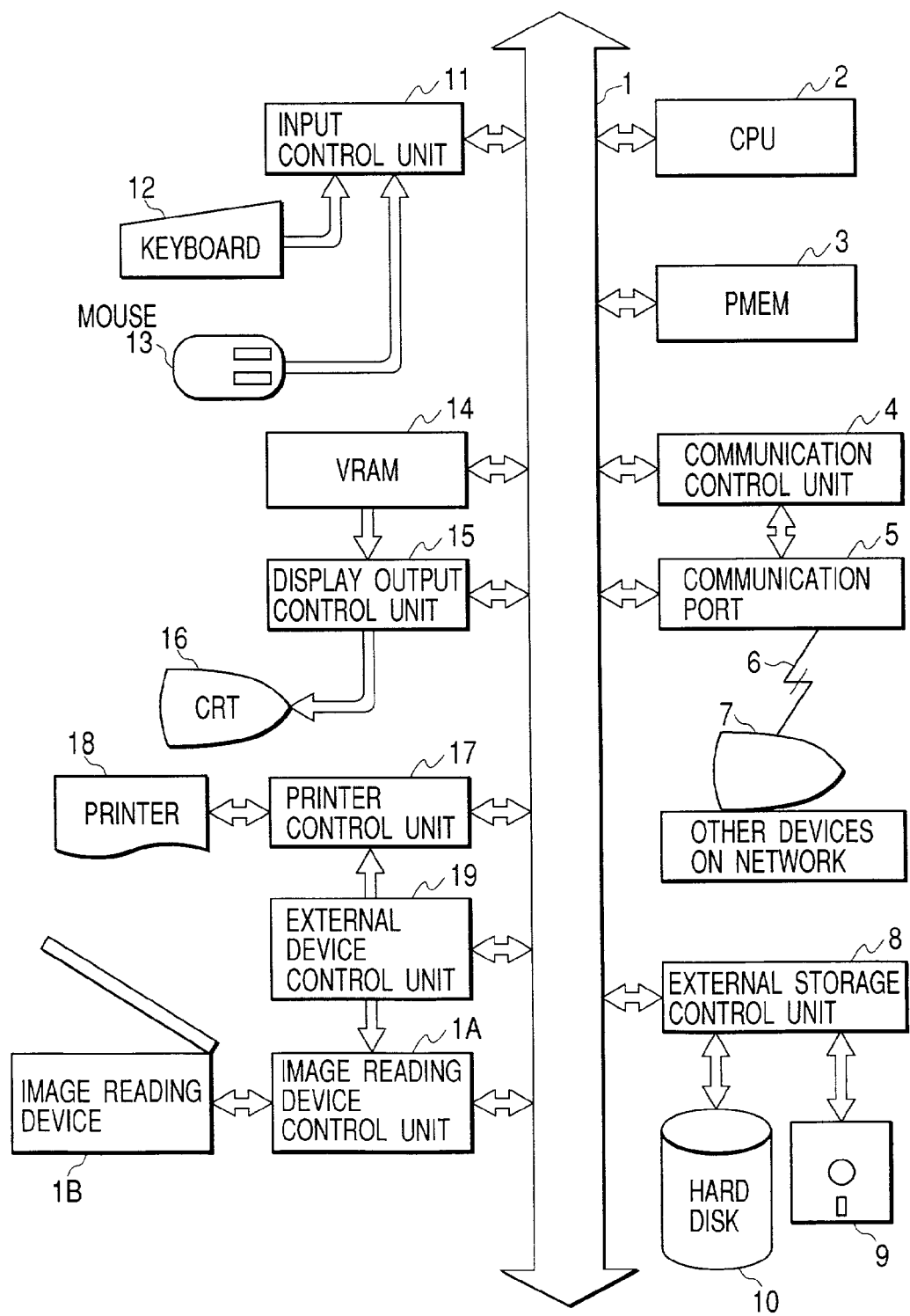
FIG. 1 is a block diagram showing a schematic configuration of an information processing unit in the present embodiment.

FIG. 1 is a block diagram describing a PC configuration showing a preferred exemplary information processing unit for use in an embodiment of the invention. In the drawing, reference numeral 1 denotes a system bus, and each component block described below is connected via this system bus 1. In an embodiment of the invention, PCs with the following configuration are used as preferred exemplary client units on which a driver is to be installed and the install server unit to give an instruction to set up a driver on the client units.

Reference numeral 2 denotes a CPU (Central Processing Unit). Reference numeral 3 denotes program memory (hereafter referred to as PMEM), which appropriately selects/reads a program for a processing described below from a hard disk 10, and executes it on the CPU 2. Data input from a keyboard 12 is also stored as code information in the PMEM serving as text memory as well.

Reference numeral 4 denotes a communication control unit, which controls data input and output at a communication port 5. A signal output from the communication port 5 travels through a communication line 6 to ports on other units (denoted by reference numeral 7 in FIG. 1) in the network. Interaction with a printer, a scanner, and the like shared on the network is performed through this communication control unit 4. In the present embodiment, while the invention is described with reference to a network such as LAN, needless to say, it is applicable also to a case where the communication port 5 and the communication line 6 connected to this communication control unit 4 constitute a common public network.

Reference numeral 8 denotes an external storage device control unit. Reference numerals 9 and 10 denote disks for data files. Thus, for example, the disk 9 is a floppy disk FD, and the disk 10 is a hard disk HD. A driver install module is stored in the HD 10 of the client unit, and an installer for setting up a driver on the client unit is installed on the HD 10 of the server unit. Each program is loaded from the HD 10 of each unit to PMEM3 as necessary, and executed at CPU 2.

Reference numeral 11 denotes an input control unit (input controlling means), to which input devices (input means) such as the keyboard 12 and the mouse 13 are connected. A user can give operational commands and the like by operating the keyboard 12. The mouse 13 serves as a pointing device PD for specifying and manipulating image information on a CRT 16, allowing a cursor to be moved on the CRT 16 in any direction on the X and Y axes so that a command icon to give an instruction for processing can be selected, a target for editing and a position for drawing can be specified, and inputting of a GUI command and the like can be executed. For example, when a user presses down on a certain part of the PD, having placed the cursor on a certain position on the screen with the PD, the driver install module installed on this unit performs operations, such as issuing various commands, in response to this input. The driver install module is a preferred exemplary transmission controlling means, and in response to a certain command, the OS can control the communication control unit, operating it to transmit desired information and so on.

Reference numerals 14, 15 and 16 denote video image memory (VRAM), a display output control unit, and a CRT (Cathode-Ray Tube) respectively. Data displayed on the CRT 16 will be expanded as bitmap data on the VRAM 14.

Reference numeral 17 denotes a printer control unit, controlling data output to a printer 18 connected to the unit. Reference numeral 1A denotes an image reading device control unit, controlling a image reading device 1B connected to the unit.

A hard disk 10 and a floppy disk 9 may also be used to store the programs stored in the PMEM 13 in the present embodiment. Further, the programs may also be stored in other units connected to the network.

Figure 2:
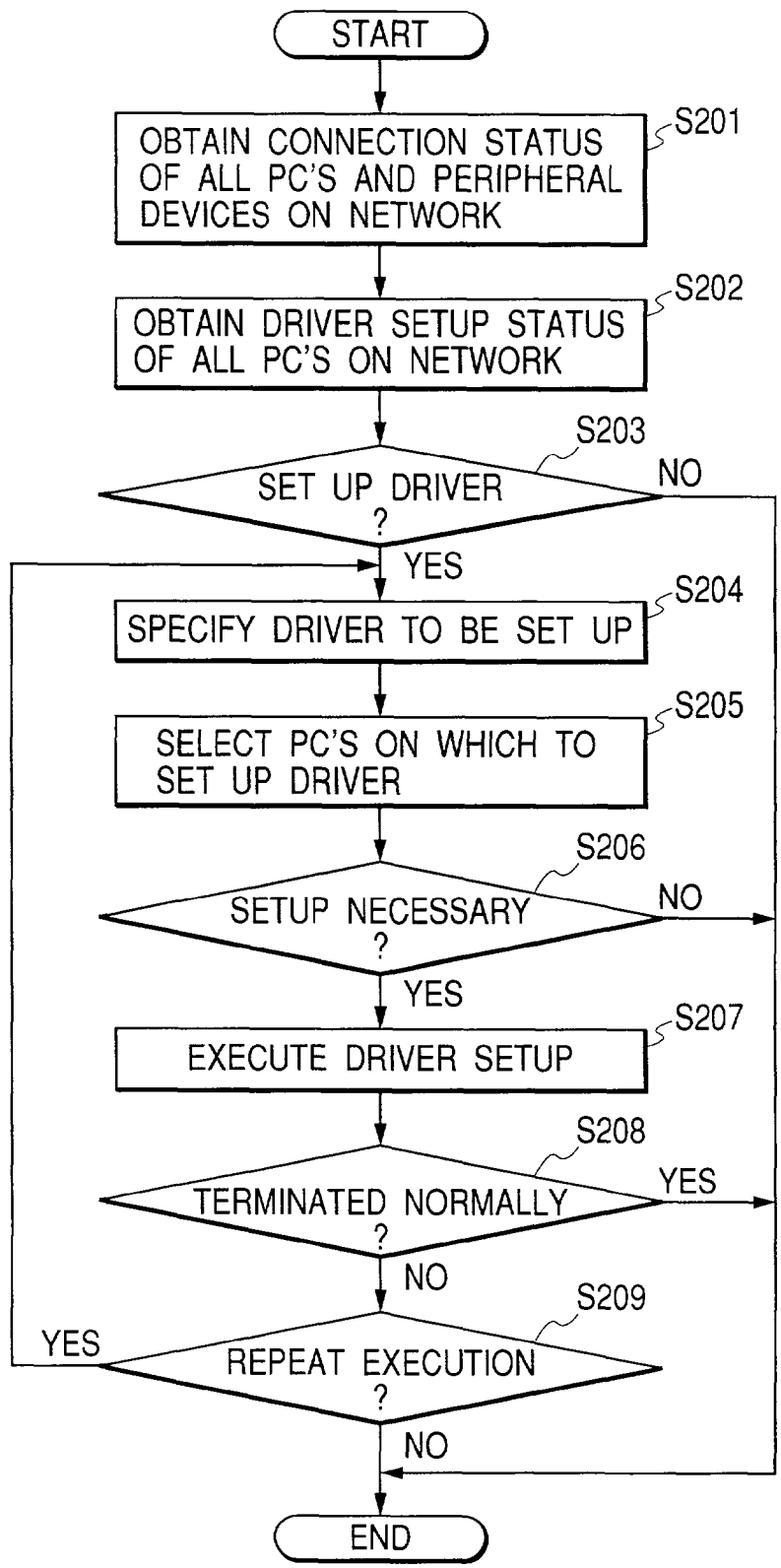
FIG. 2 is a flow chart showing the processing of setting up a driver.

In the following, cases where drivers for peripheral devices are set up will be described with reference to FIGS. 2 to 9. FIG. 2 is a flow chart showing the processing of setting up a driver. First, in step S201, a server unit, which is a preferred exemplary information processing unit, obtains the connection status information for the PCs and the peripheral devices in the network by means of a device managing module (device managing means) in the server unit, and stores the information. The peripheral devices, for example, include a inkjet printer, a digital camera, a copy machine with a printer function, and the like.

Next, in step S202, the server unit obtains and recognizes information indicating the setup status of peripheral devices for each PC. The drivers for peripheral devices include those for a printer, a scanner, a digital camera, a FAX, and the like. As a method of obtaining setup status information, for example, on each PC, a module (device managing means) that obtains driver information installed on its own machine can be envisioned so that when invoked, it communicates with peripheral devices and other PCs, collects information, and communicates the information via the network. The driver information includes, for example, device drivers for controlling peripheral devices, and the driver setup status of peripheral devices includes registered names of registered peripheral devices, names of drivers for operating these peripheral devices (driver names registered with the system), driver version information, driver module names, and the like. A driver name is a preferred exemplary printer identification information. A driver name is a preferred exemplary driver identification information. For example, printer and driver names include identifiers such as numerals and symbols that are not character strings and that can be recognized by an information processing unit.

FIG. 3 shows an exemplary driver information structure being set up. It consists of a PC name, an IP address, an OS type, a user name, the number of device drivers, and information for each device driver. Each device driver information consists of a device type such as "printer" or "scanner", a driver name, version information, an output port, and sharing information. For example, for the first registered printer, the driver name is printer 2000, the version is 1.00.00, the output port is local, and the sharing information is indicating a sharing configuration (ON).

Figure 4:
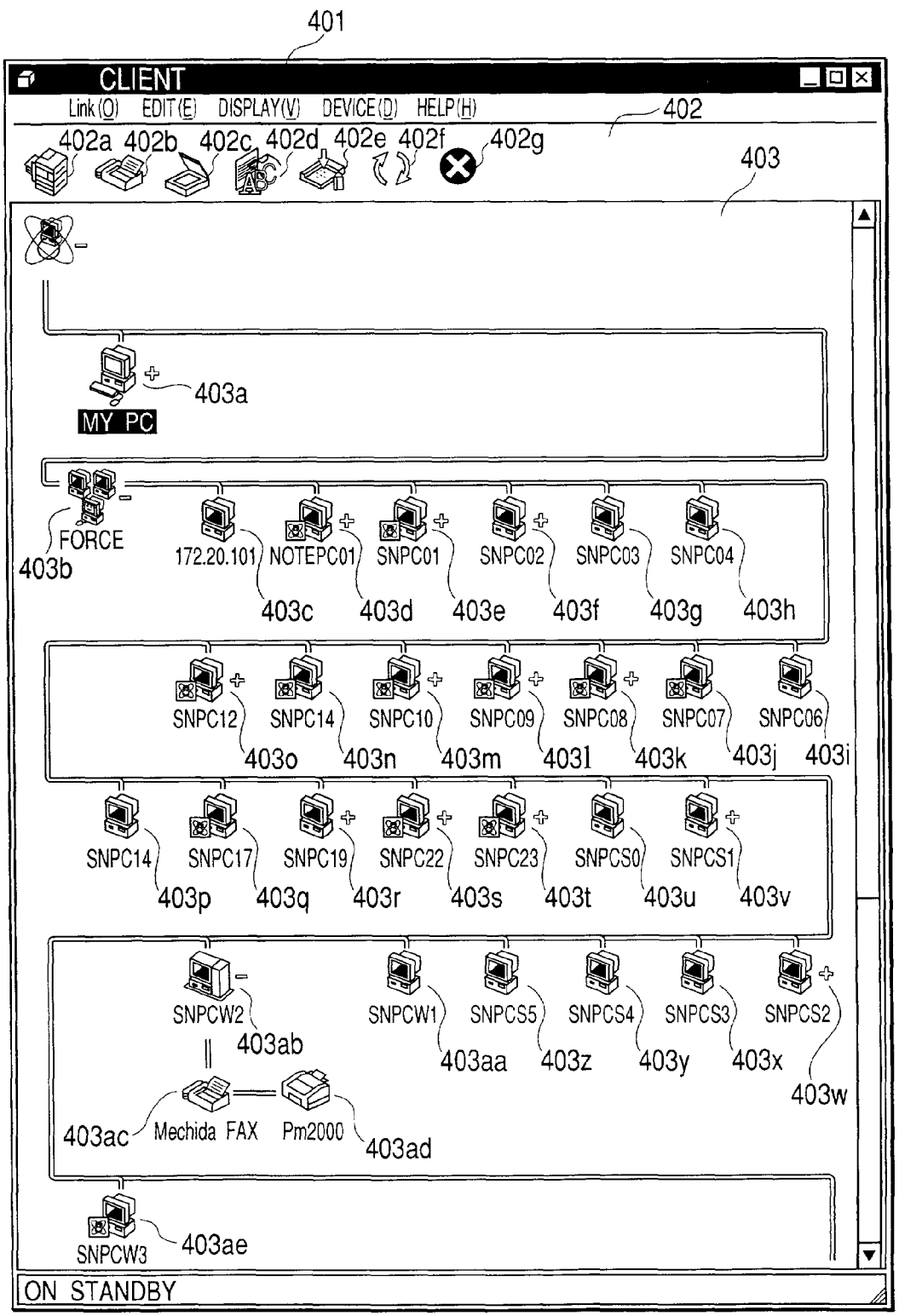
FIG. 4 shows an exemplary screen displaying PCs and peripheral devices on the network.

FIG. 4 shows an exemplary screen displaying PCs and peripheral devices in the network. Reference numerals 401, 402, and 403 respectively denote a menu, a toolbar, and a main window in which icons representing PCs and peripheral devices in the network are displayed.

Reference numerals 402*a* to 402*g* denote icons representing respective functions to be performed by operating PCs and peripheral devices at the toolbar 402. For example, the icon 402*a* is one for executing a copy function to read image data from a selected scanner and output the image data to a selected printer. The icons 402*b*, 402*c*, 402*d*, 402*e*, 402*f*, and 402*g* are respectively those for executing a FAX function, an image data reading function, an image data reading function with OCR processing, a function to manage FAX receive data and distribution data, an information updating function, and a function to terminate updating.

Reference numerals 403*a* to 403*ae* denote icons representing PCs and peripheral devices shared on the network. These icons 403*a* to 403*ae* are displayed in different forms according to device types such as "PC", "printer", "scanner", and "FAX modem", or device status such as "processing", and "error has occurred". The icon 403*a* is one that represents a user's own machine, while the icon 403*b* is one representing the domain where the user's machine is logged on. Since a user's own machine is a special one, it is displayed distinctly from other PCs.

Also, icons such as the icon 403*ad* representing PCs and peripheral devices which are shared on the network, but on which drivers are not installed, are displayed in gray. Also, icons such as the icons 403*d* and 403*e* with connected devices, which nevertheless are not displayed in expansion, are displayed with "+" marks, while those such as the icon 403*ab* displayed in expansion are displayed with "−" marks. Those having no connected devices such as the icons 403*c* and 403*g* bear no marks.

In this manner, the connection states, and furthermore status of all the PCs and peripheral devices in the network can be checked on the screen. In this example, because of the limited space on the screen, not all the icons are displayed. But, it is possible to see the existence of all the PCs and peripheral devices using the scroll bar located at the side of the screen.

Figure 5:
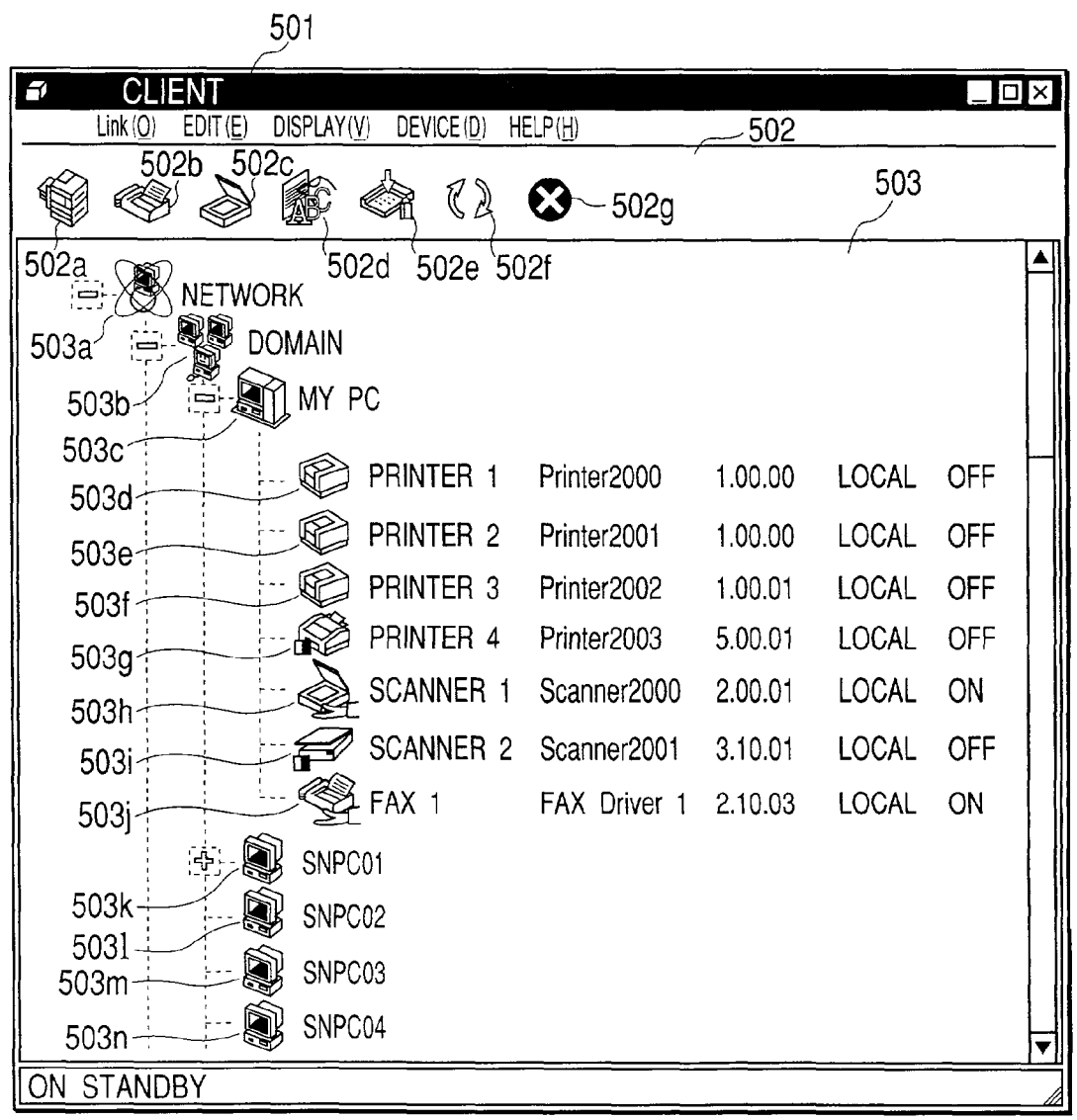
FIG. 5 shows an exemplary screen displaying the driver setup status of each client unit on a network.

FIG. 5 shows an exemplary screen displaying the driver setup status of each client unit on a network. Reference numerals 501, 502, and 503 respectively denote a menu, a toolbar, and a main window in which icons representing PCs and peripheral devices in the network are displayed.

Reference numerals 502*a* to 402*g* denote icons representing respective functions to be performed by operating PCs and peripheral devices at the toolbar 502. What is involved is similar to the cases of icons 402A to 402*g* shown in FIG. 4. Reference numerals 503*a* to 503*n* denote icons representing PCs and peripheral devices shared on the network. There, driver information for peripheral devices is displayed, allowing the user to see it.

Returning to the flow chart in FIG. 2, in step S203, the installer in the install server unit determines whether or not to set up a driver for a peripheral device. For example, the printer 403*ad* in FIG. 4 can be selected and a driver setup instruction can be given through the menu. Here, if no driver setup instruction is given, the processing is terminated.

Figure 6:
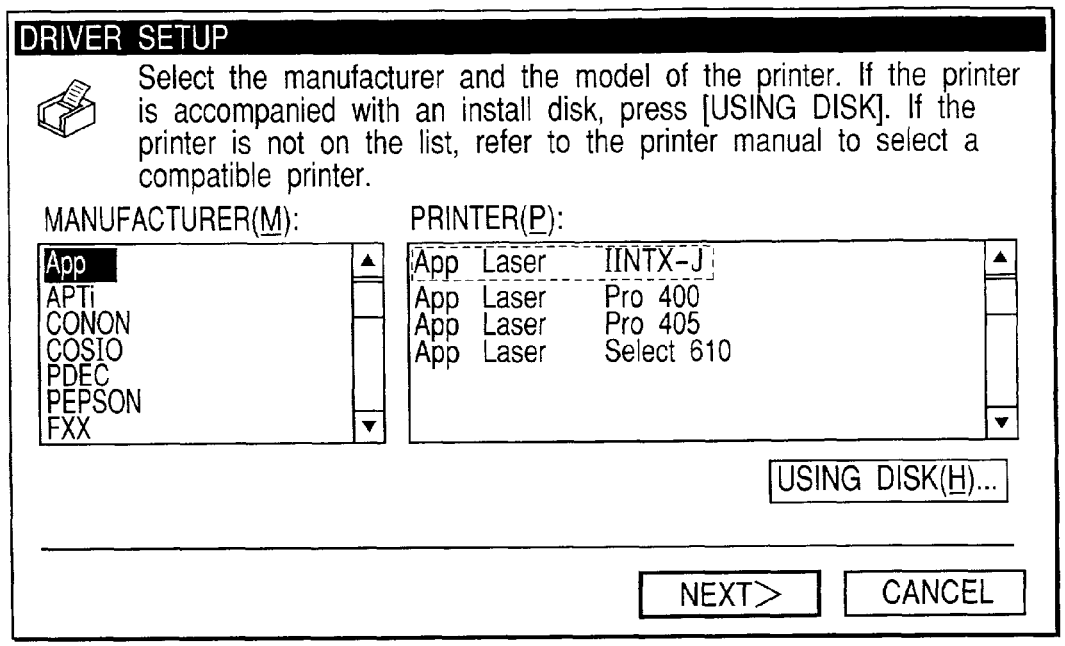
FIG. 6 shows an exemplary screen for selecting a driver to be set up.

If a driver setup instruction is given, the processing proceeds to step S204, where a screen is displayed for letting the user specify the driver to be set up. FIG. 6 shows an exemplary screen for selecting a driver to be set up. There, the user specifies a target printer by selecting the manufacturer. The user can also specify the folder in which setup information is located.

Figure 7:
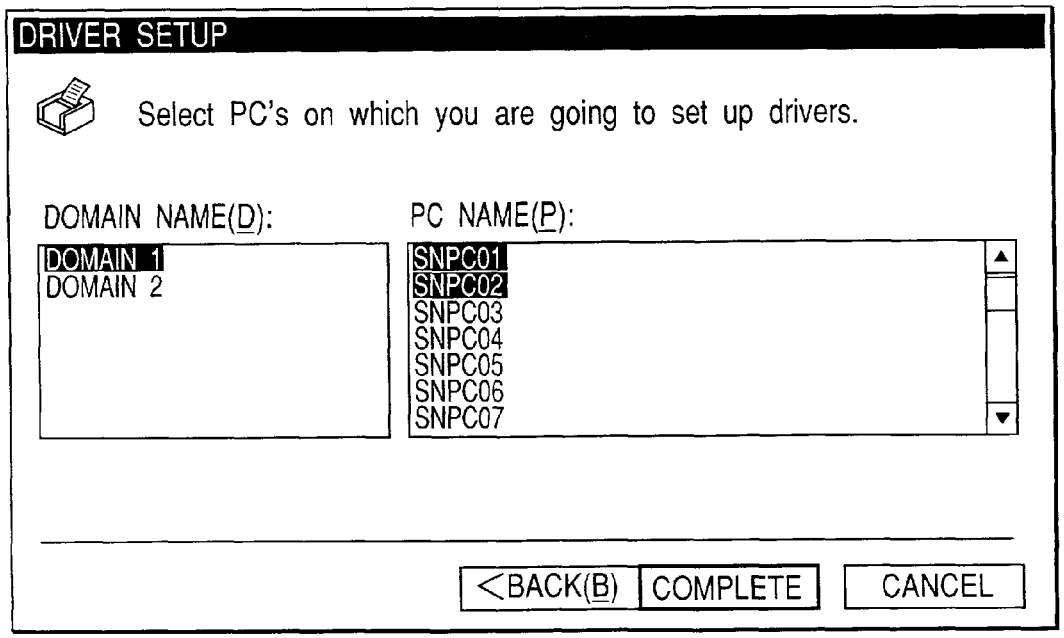
FIG. 7 shows an exemplary screen for selecting client units on which a driver is to be set up.

Further, in step S205, the installer (selection indicating means) in the install server unit selects and indicates client units on which a driver is to be set up based on input from a pointing device (PD) such as a mouse. FIG. 7 shows an exemplary screen for selecting client units on which a driver is to be set up. There, domains and client units can be selected. A plurality of client units can be selected here.

If an OK is indicated through a PD and the like, the installer (determining means) in the install server unit proceeds to step S206, where it determines whether or not it is necessary to set up the specified driver on each one of the specified client units based on driver information from respective client units. If there is no necessity for the setup such as, for example, when the specified driver is already installed, the installing will not be performed.

If there is a need for setup, the installer in the install server unit proceeds to step S207, where it controls the OS to send an instruction for performing a setup operation for the driver specified in step S204 on the client units determined by the installer as requiring setup, the determination being made among those client units specified in step S205. Here, the installer in the install server unit, if it determines that there are a plurality of client units requiring setup, controls the OS to send driver information to the plurality of client units. Then, the driver setup operations are performed based on that instruction. The setup instruction includes a driver setup instruction structure as well as a setup specifying command. FIG. 8 shows an exemplary driver setup instruction structure contained in a driver setup instruction. The structure consists of a device type, a driver name, version information, an output port, setup information and the like. Here, the setup information may be sent together with this structure, or it may be stored in a folder shared on the network, specifying the pathname.

Then, in step S208, the installer in the install server unit determines whether or not the driver setup operation has been terminated normally. In one determination method, the determination will be made based on whether or not the install operation has been performed normally, as well as on whether or not the driver operates normally in actual use. For example, a message for a normal termination may be sent to the client unit that gave a setup instruction when a driver has been installed normally, allowing the normal termination to be confirmed on the screen.

In the case of a printer, whether the driver has been installed normally may be determined by performing test printing and checking the printing result. FIG. 9 shows an exemplary driver setup check printing. In this manner, by printing the name of the output source client that requested the printing, the driver name, and the version information, it is possible to confirm on which client unit the setup operation has been completed normally. In the case of normal termination, the processing is terminated.

If the operation has not been terminated normally, the processing proceeds to step S209, and the installer in the install server unit determines whether or not to instruct re-execution for the client units on which a normal termination has not been achieved. If there is an instruction for re-execution, the processing returns to step S204, and if there is no instruction for re-execution, the processing is terminated.

As stated above, at the screen on which client units and peripheral devices shared on the network are displayed, if it is found that a driver for a peripheral device is not installed, one can install the driver with a simple operation, and also check if it has been successfully installed, thus greatly improving work efficiency in the network.

Figure 39:
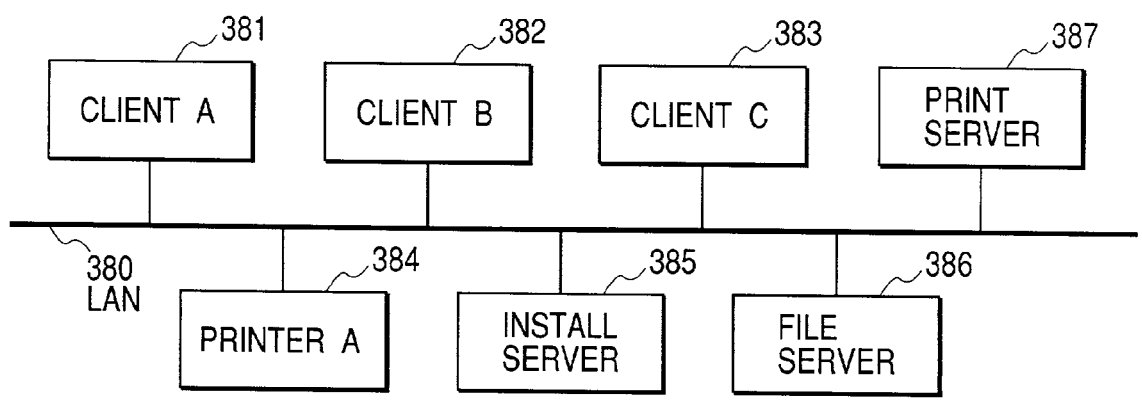
FIG. 39 is an exemplary printing system illustrating the present embodiment.

FIG. 39 is an exemplary printing system illustrating the present embodiment. Preferred exemplary clients, client unit A represented by 381, client unit B represented by 382, and client unit C represented by 383, and preferred exemplary servers, install server unit 385 and WEB server unit 386 are connected via a preferred exemplary network, LAN (Local Area Network) 360. The install server unit 385 and WEB server unit 386, and the client units 381 to 383 in the present embodiment consist of PCs as exemplary information processing units, and their internal structure is similar to that shown in FIG. 1.

Figure 32:
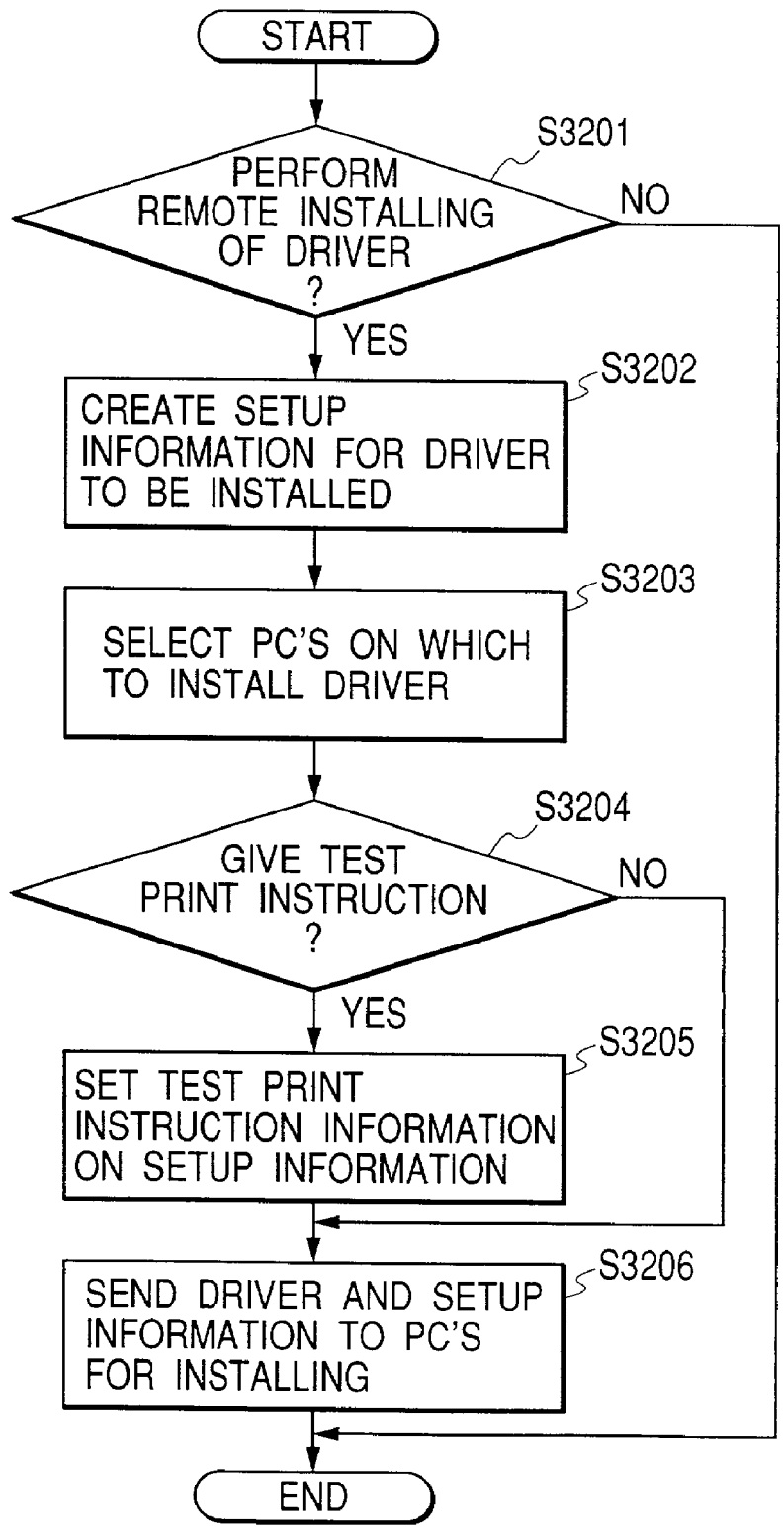
FIG. 32 is a flow chart showing exemplary processing at the install server unit 385.

FIG. 32 is a flow chart showing exemplary processing at the install server unit 385 to be performed when an instruction for remote installing of a driver is given from the install server unit 385. This processing is started when the installer (transmission control means) with a remote installing function that is installed on the install server unit 385 is invoked. In the following, the operation of the installer at the install server unit 385 is illustrated. In the following, the client unit A, client unit B, and client unit C are together referred to as "respective client units".

Figure 33:
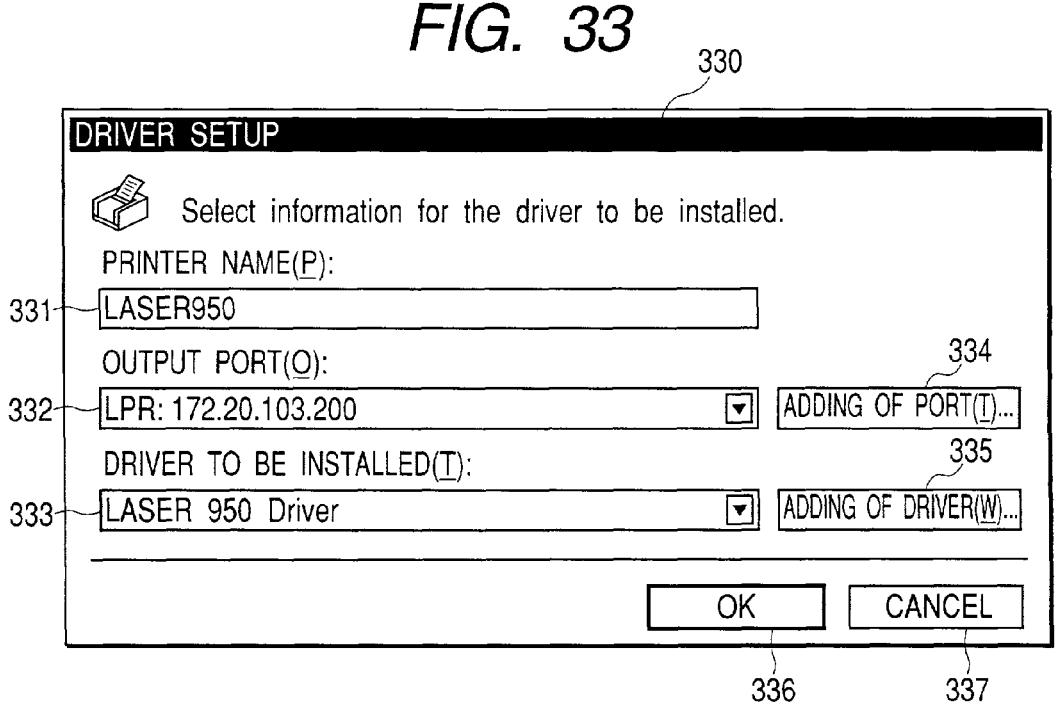
FIG. 33 shows an exemplary screen for setting driver information at the install server 385.

First, in step S3201, the installer in the install server unit 385 determines whether there is an instruction for remotely installing a driver on respective client units in step S3201. In the remote install instruction, for example, when the user operates the mouse 13 of the keyboard 12, referring to a graphical user interface displayed on the CRT16 of each client unit in FIG. 1, a setup instruction is input in the input control unit 11 in response to that operation. Then, if the installer in the install server unit 385 determines that there is no instruction for remote installing, it terminates the processing. If remote installing is to be performed, the installer in the install server unit 385 proceeds to step S3202. If the installer in the install server unit 385 determines that there is an instruction for remote installing in step 3201, it proceeds to step S3202 to create driver setup information for the driver to be remotely installed. The driver setup information includes information that has been collected in advance and managed by the device managing module (device managing means) in the install server unit, such as, for example, a driver name as exemplary identification information for the driver to be installed, a driver version number as preferred exemplary information to show a driver version, a printer name as preferred exemplary device identification information, an output port name, a module for making a port available, and a driver setup instruction. A printer name is a registration name to be registered with a registry and the like on the OS of each client unit. FIG. 33 shows an exemplary screen for setting driver information.

Reference numeral 331 denotes a printer name specifying unit. At the printer name specifying unit 331, a printer name to be registered with each client unit can be selected or entered. The printer name specifying unit 331 may also allow a plurality of printers searched in the network to be specified there. Next, reference numeral 332 denotes a port specifying unit. At the port specifying unit, a port can be added by pressing down on the port addition specifying unit. FIG. 33 shows how logical ports corresponding to an IP address and lpr are created, the IP address being information to indicate the location of a printer in the network, and the lpr being a printing protocol specified to be used lpr is a traditional print managing program developed with OSs of the BSD family, but other print managing programs may be used. Reference numeral 333 denotes a driver specifying part, which is for specifying a driver to be installed on each client unit. By operating the driver addition specifying unit 335, a driver can be specified.

The forgoing is an example of port creation for the case where TCP/IP and lpr are used to have a network printer process a printing job. A port can be created for a local printer as well. For example, in the case where a local printer for a client unit is configured, a COM port and LPD port may be specified, and setup status information may be created accordingly.

It is also possible to configure a port to represent printing via a print server. For example, if the print server name for the print server 387 is "SVPC1", and the printer name for the printer 384 is "LASER950", by specifying "¥¥SVPC1¥LASER950" as a port, a port is set to have the LASER950 process a printing job with the SVPC1 as the print server.

In the processing describe above, the install server unit 385 is automatically determining OS types and OS versions based on information for respective client units collected in advance and stored in the install server unit 385. However, when the OSs installed on respective client units cannot be automatically determined, the graphical user interface shown in FIG. 33 may be modified so that the user can specify OS types and versions as well as CPU architectures prior to the generation of setup information by the installer in step S3202.

Figure 34:
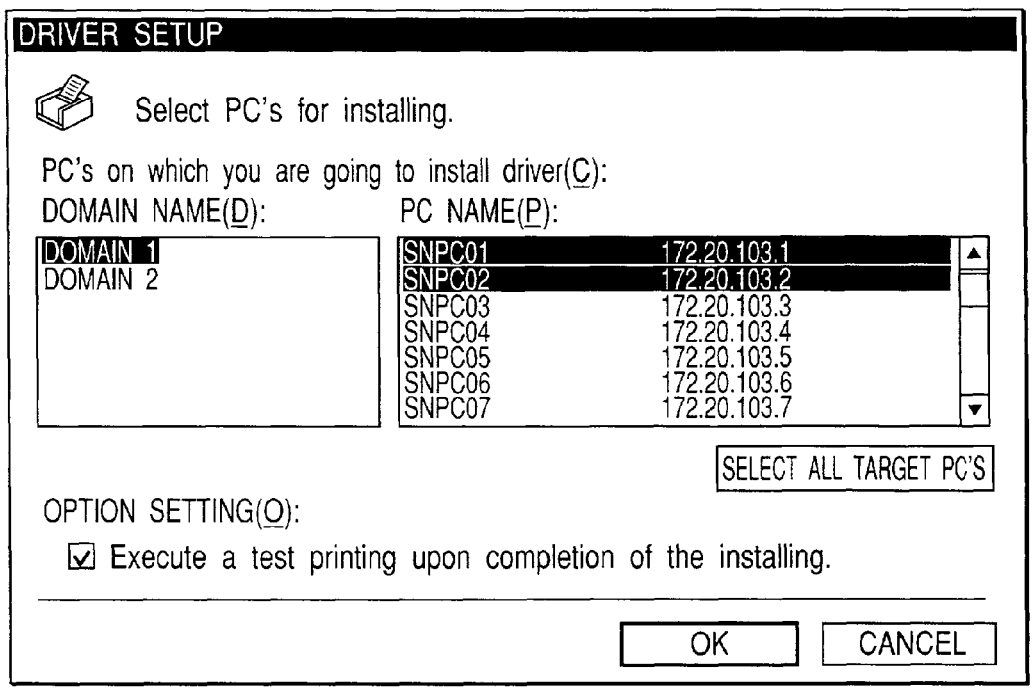
FIG. 34 shows a screen for selecting client units at the install server 385.

Next, the processing proceeds to step S3203, where as shown in FIG. 34 the installer (selecting means) in the install server unit 385 selects a client unit on which a selected driver is to be installed. It is also possible to select a plurality of client units at a time. Once client units for installing are selected, the installer (determining means) in the install server unit 385 determines the selected PCs, and performs the processing in step S3204. Then, the installer in the install server unit 385 makes a setting either to execute or not to execute test printing at the completion of driver install on respective client units. If the installer in the install server unit 385 does not make a setting to execute test printing, the process proceeds to step 3205 and it performs the processing of step S3206. If the installer in the install server unit 385 makes a setting to execute test printing, it makes the OS or the printer driver generate test print instruction information and have the information additionally stored in the setup information.

FIG. 34 is an exemplary screen for specifying client units for driver setup and for giving an instruction for test printing. In this manner, a plurality of client units may also be manually selected at a time. ON/OFF for text print execution may also be set. While client units are selected from within a domain in this example, other specifying methods may also be used.

In step S3206, the installer in the server unit (determining means) determines a specified client unit(s), controls the OS to send the determined client units the setup information set in the above described process and the driver to be installed as driver information, and then terminate the processing.

Figure 37:
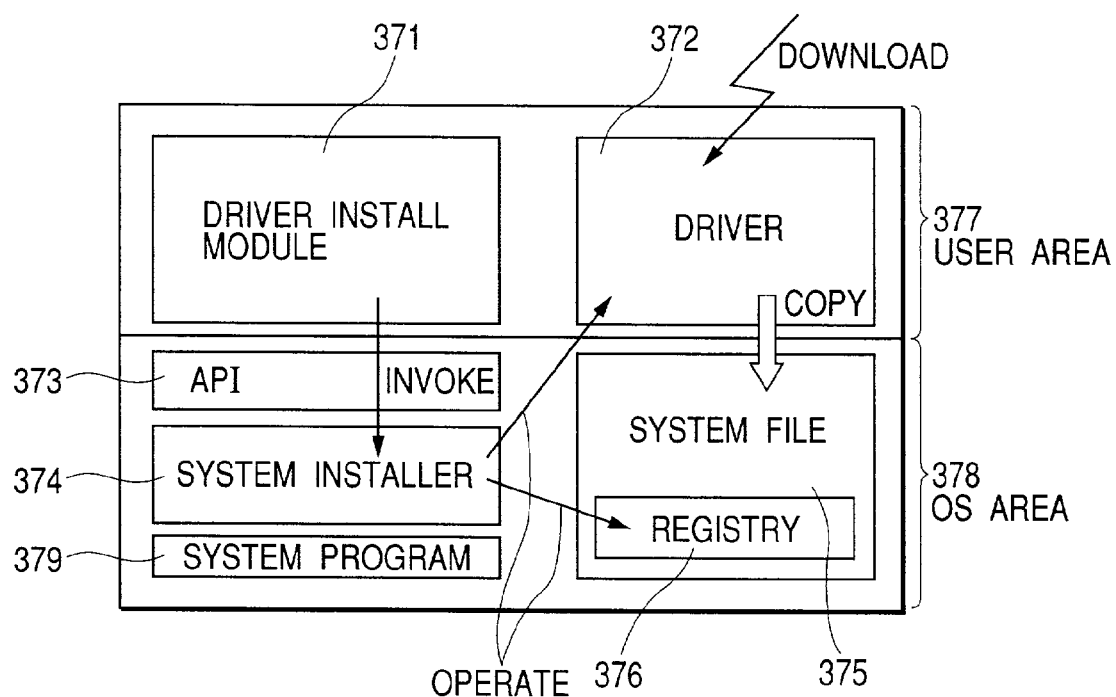
FIG. 37 shows a preferred exemplary software module in each client unit.

FIG. 37 shows a preferred exemplary software module in each client unit. Here, general processing for installing a driver will be described. OSs are installed on client units. The configuration within each client unit is such that there is a division between a user area 371 and OS area 377. A driver install module 371 is provided as an application to run on the OS, and it is a preferred example of program managing and recognizing means. The system program shown as 391 registers with a registry 376 a driver name stored in the client unit, a version number, a printer name, and a directory for a driver within the system. The driver installer module (recognizing means) can recognize information in the registry 376 through an API (Application Programming Interface) of the OS. In this case, the driver install module 371 is designed to operate in response to commands received from external devices. The driver install module 371 (program managing means) invokes a system installer 374 (installing means for the OS) through the API. The system installer is provided as a function of the OS, and it copies or moves to a system file area 375 a driver 372 introduced from outside and being stored in the user area 376. As part of this system file area, a registry area 376 is reserved for registering various kinds of information for devices using drivers. Also, the driver installer module 371 can invoke the system installer 374 to have device information stored in the registry area.

Figure 35:
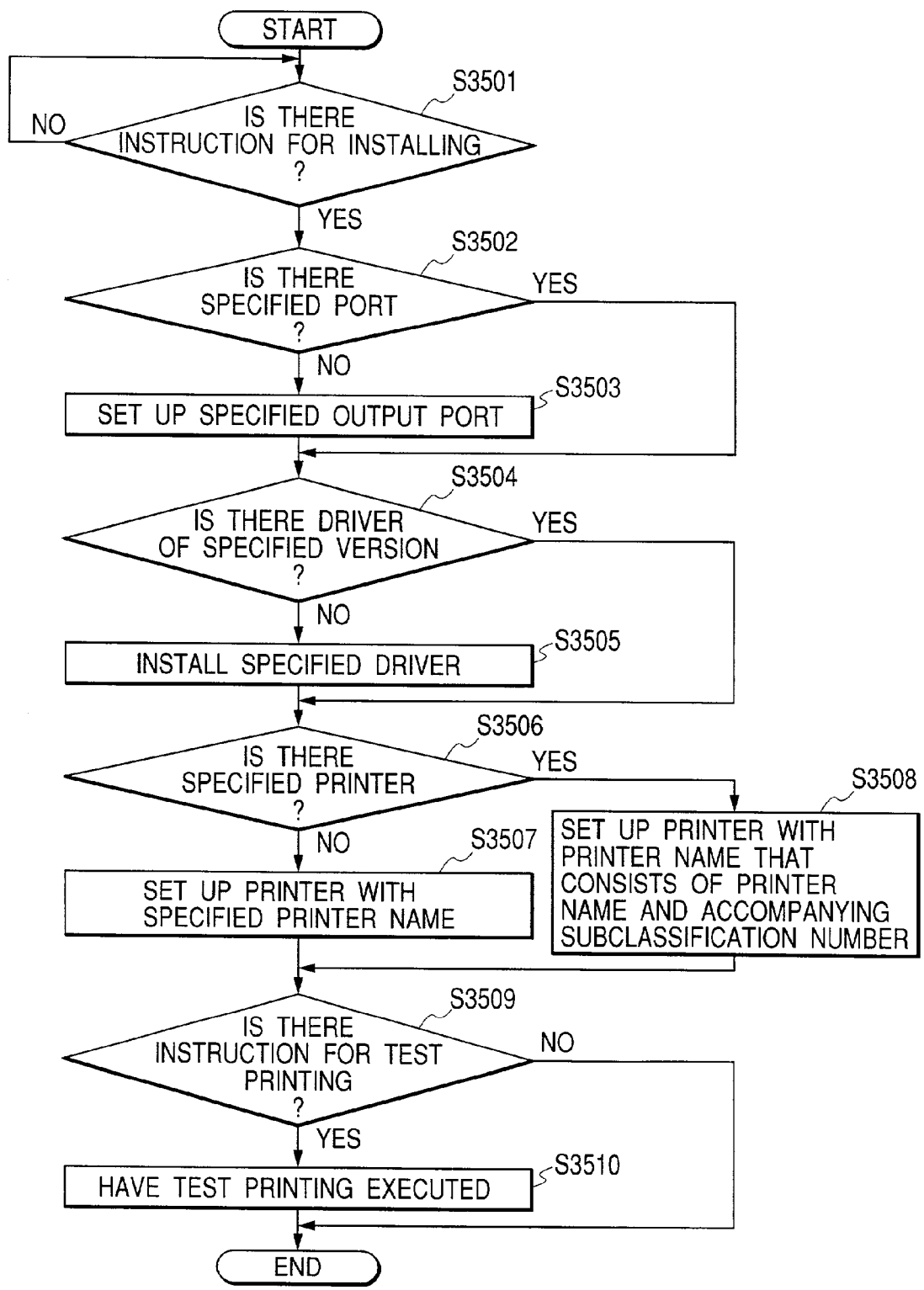
FIG. 35 shows exemplary processing at each client unit when an instruction is given for remote install of a driver from the install server unit 305.

FIG. 35 is a flow chart of exemplary processing at each client unit when an instruction is given for remote install of a driver from the install server unit 305. No operator is necessary at each client unit. An already invoked module for installing a driver (hereafter referred to as a driver install module) is monitoring for an instruction to come in from the install server unit 305 with no request sent from the clients to the install server unit for setup instructions.

Here, the driver install module is assumed to always reside in client units. The driver install module is waiting for an instruction from the install server unit 305. The driver install module may be invoked in response to an invoking command in a remote setup instruction from the install server unit 385, making the module start an install operation automatically. Preferably, the driver install module will be remotely invoked using SOAP (Simple Object Access Protocol), which is an example of RPC. Alternatively, each client unit may receive a reboot command from the install server unit 385. Each client module may be configured to invoke the driver install module upon rebooting of each client unit so that the driver install module executes a setup instruction after the rebooting. Compared to the case where the driver install module is always resident in the client, this allows resources such as RAM to be utilized more efficiently, and also allows security to be enhanced.

In the following, processing at the driver install module will be described.

First, in step S3501, the driver install module (recognizing means) recognizes and determines whether there is an install instruction from the install server unit 305. If there is no instruction, the install processing is terminated. If there is an install instruction, the processing proceeds to step S3502. In step S3502, the driver install module determines whether the output port stored in the setup information is already configured. If the specified output port already exists, the processing proceeds to step S3504. If the output port does not exist, then the processing proceeds to step S3503, where the driver install module sets up the specified output port. Specifically, for example, when printing is processed using lpr on TCP/IP, the driver install module instructs the OS to incorporate a lpr module and creates a corresponding logical port. Here, preferably, a lpr module contained in the setup information created in step S3202 is used. Then, the processing proceeds to step S3504.

In step S3504, the driver install module determines whether a driver corresponding to the driver name and version specified for installing is already configured. If the specified driver is already configured, the processing proceeds to step S3506. If the specified driver is not configured, then the processing proceeds to step S305. In step S305, the driver install module (program managing means) executes the installing of a driver. Here, the driver install module controls the install operation by instructing the OS to automatically store in a set storage area in the client unit the body of a program contained in the setup information created in S3202. When the driver install operation is finished, the processing proceeds to step S3506.

In step S3506, whether or not the printer specified for installing already exists is determined. In the present embodiment, names registered with the registry in the OS of each client unit is searched to determine whether or not there is the same name as the printer name about to be newly registered. If the same printer name does not exists, the processing proceeds to step S3507, and a printer is configured with the specified printer name. In the present embodiment, the driver installer module instructs the OS to register this printer name with the OS registry as a new printer. Then, the driver installer module controls the OS to associate the printer name with a driver. If the printer already exists, then the processing proceeds to step S3508. Since the OS cannot setup a different printer with the same name, it automatically creates a different printer name, for example, by adding a sub-classification number or the like. Then, the driver installer module controls the OS to perform such configuration as establishment of association between the printer driver and the printer name by the printer name. Then, the processing proceeds to step S3509, where the driver installer module determines whether or not there is a test printing execution instruction. If there is no test printing execution instruction, the driver installer module terminates the install processing. If there is a test printing execution instruction, the driver install module have the printers on which installing has been completed execute test printing. Specifically, the driver generates a job to output a text that includes the name of the user's own client unit as well as printer and driver names to be printed, sends the job to the printer, and have the printing executed. Alternatively, a printer that generates a text output that includes the name of the user's client unit, a printer name (printing request source), and a driver name sends another printer a recognizable command.

Note that a program constituting the body of a driver is sent as driver information in S3206. In another embodiment, instead of sending a driver, the install server unit 385 may send a URL indicating the location within the network of the driver to be installed along with setup information. The driver install module may download the driver from the WEB server 386 indicated by the URL, and instruct the OS to execute the installing.

In the above described embodiment, setup information is generated merely with a batch setup instruction from the install server 305, and install operations are performed automatically or semi-automatically at the client units based on that information. This has an advantage of eliminating the necessity for performing a different operation for each device such as the installing, version upgrading, and setting up of a driver, working on each client unit in turn. This has a further advantage of eliminating the necessity for performing for each client unit a complicated operation such as properly selecting the type of the driver depending on the environment of the device or client unit, the version of driver to be newly installed or updated and so on, instructing the client unit to register the specified printer name, and associating a printer to be registered with the driver.

Additionally, according to the embodiment described above, with the enforcement of test printing, the necessity to check the operation of a peripheral device for each client unit is eliminated even when a driver is added or updated at client units, for example, by a service person giving a driver setup instruction for a plurality of client units at the install server unit 305. For example, there is an advantage that a determination can be made as to whether or not the printing system is configured to allow the printer that has been set up to perform normal printing operations only by checking the test printout output at the printer without checking setting of each client unit. The determination includes the one whether the setup of the drivers for individual clients completed properly, and the one whether the print server operates properly.

Figure 36:
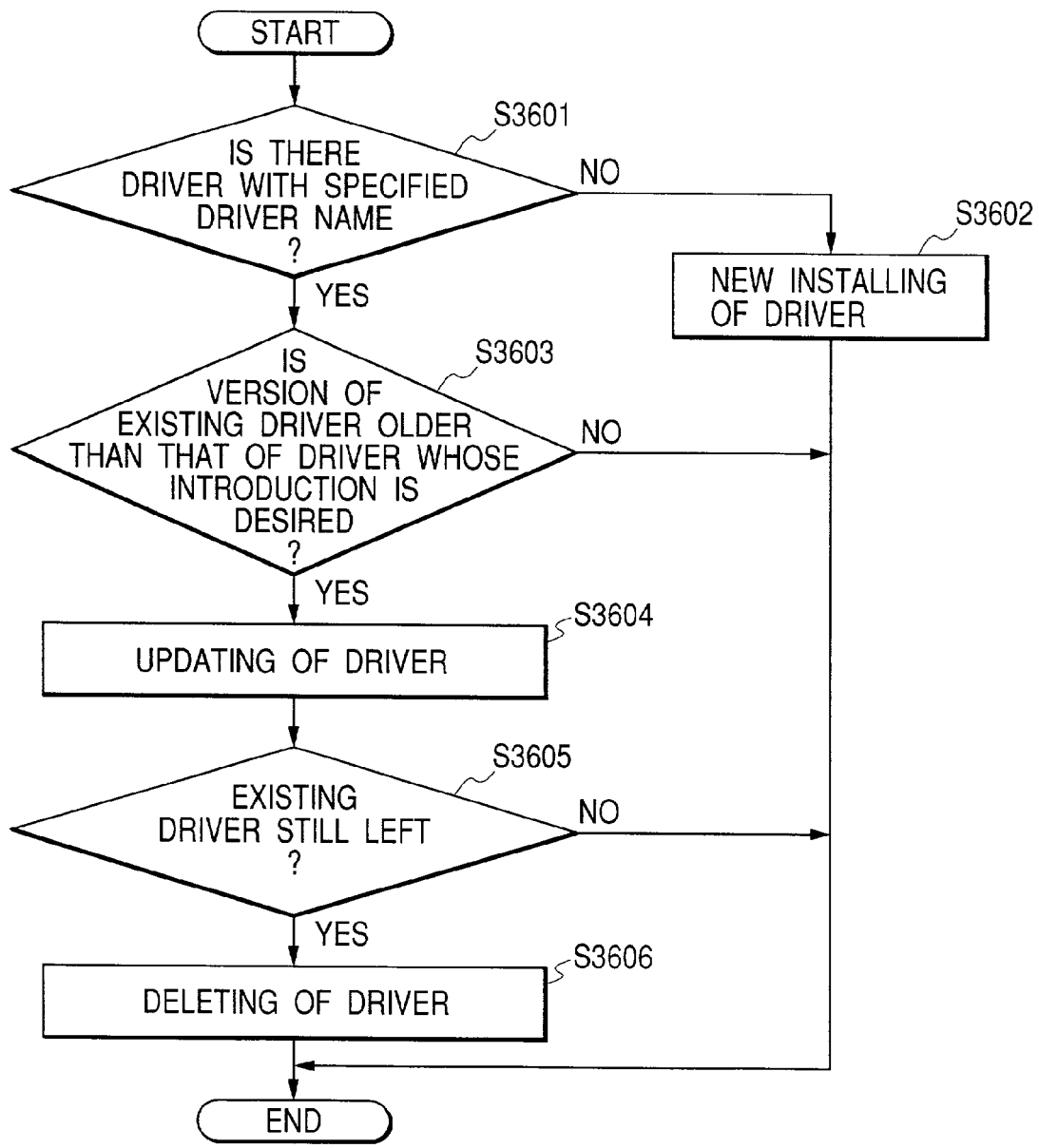
FIG. 36 shows variant processing corresponding to S3504 and S3505 in FIG. 35.

In the following, the part that varies from the above described embodiments will be presented. FIG. 36 shows a variation corresponding to S3504 and S3505 in FIG. 35. An operation is shown which is invoked when a driver install module at a client unit proceeds to installing a driver after a port has been set up based on a setup instruction from the install server unit 305. After this operation, a printer registration operation is invoked.

In this embodiment, if driver updating is selected as an instruction to set up a driver at the install server unit 385, information for the driver updating instruction will be stored in driver setup information, which represents preferred exemplary information to indicate setup status, and then sent to a client unit from the install server unit.

In S3601, the driver install module determines if a driver with the driver name specified in the driver setup information exists. If the driver install module determines that a driver with the specified name does not exist, it performs an operation to newly install a driver in S3602. Specifically, it stores a driver module constituting a driver with the specified driver name in a set storage area of the client unit. On the other hand, if the driver install module determines that a driver with the driver name specified in S3601 exists, then it performs the operation of S3603. In S3603, the driver install module determines whether or not the version of the existing driver in the client unit is older than that of the driver specified in the driver setup information for updating. In S3603, if the driver install module determines that the version of the existing driver in the client unit is older than that of the driver specified in the driver setup information for updating, it instructs the OS to perform a driver updating operation in S3603. Then, the OS that received the instruction from the driver install module stores the driver module in a set storage area of the client unit, and the processing proceeds to S3606. On the other hand, in S3604 if the driver install module determines that the version of the existing driver in the client unit is newer than the version of the driver specified in the driver setup information for introduction, then the processing is terminated. In S3606, the driver install module determines whether or not the previous driver is still left there. If in S3606 the driver install module determines that the module of the driver is no longer left, having been completely overwritten by the new driver, then the processing is terminated. If in S3606 the driver install module determines that part of or the whole of the driver module is still left, then the driver module is deleted, and after the deletion, the processing is terminated.

Figure 38:
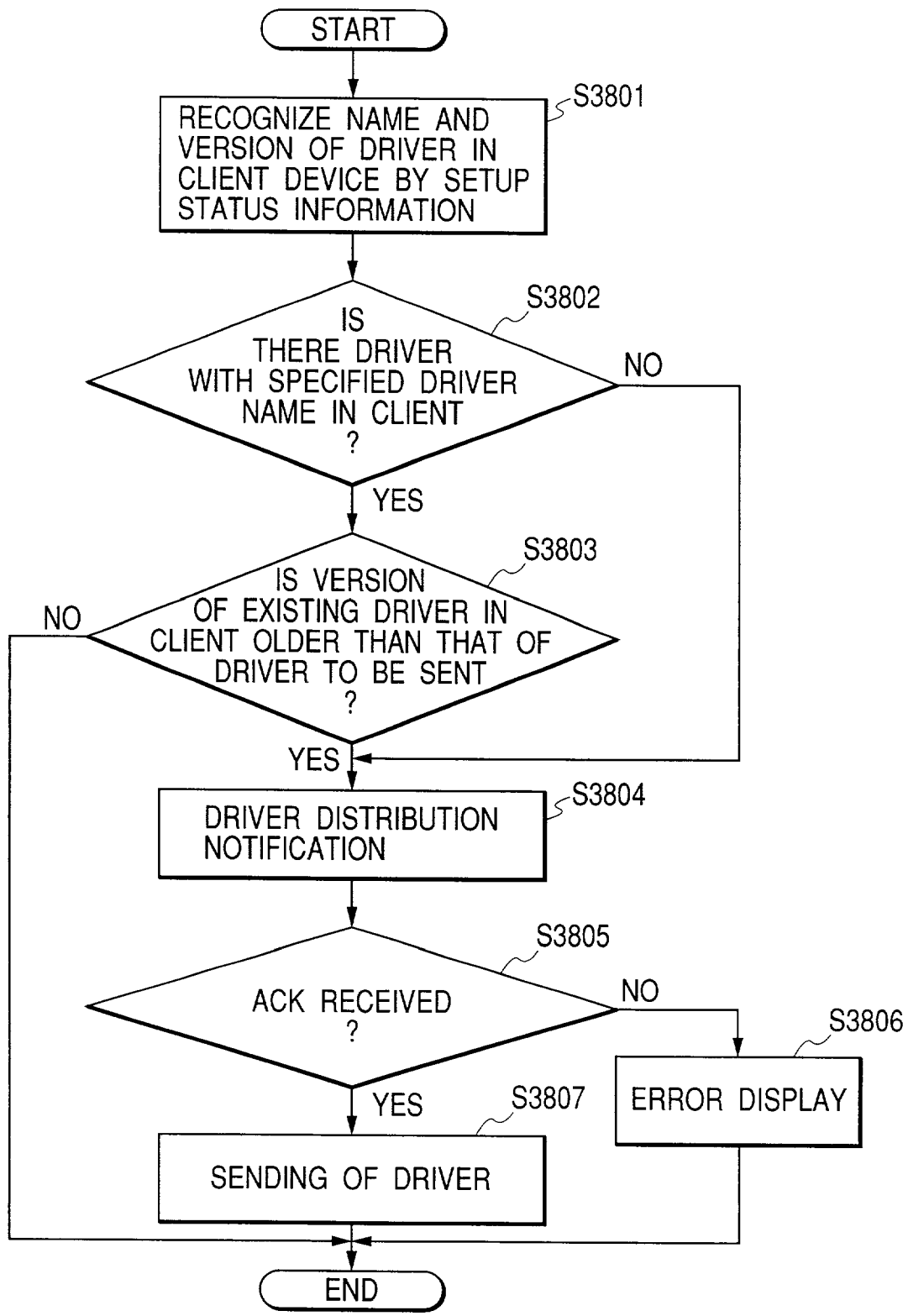
FIG. 38 shows variant processing corresponding to S3206 in FIG. 32.

In the following, the part that varies from the above described embodiments will be presented. FIG. 38 shows a variation corresponding to S3206 in FIG. 32. An operation is shown which is invoked when a driver install module at a client unit proceeds to installing a driver after a port has been set up based on a setup instruction from the install server unit 305. After this operation, a printer registration operation is invoked.

In S3801, the installer in the install server unit 385 searches for a driver name and version information in the client unit by referring to driver setup information, which is preferred exemplary setup status information for peripheral devices managed by a device managing module (device managing means), the information being collected through communication with client units and peripheral devices and stored in the install server in advance. Then, in S3802, the installer in the install server unit 385 determines whether a driver with the name specified in the driver setup information is in the client unit. If in S3802 the installer in the install server 385 determines that a driver with the specified name does not exist, it controls the transmission operation of the OS to make the server unit actively send a driver distribution notice to the client in S3804. On the other hand, if in S3802 the driver install module determines that there is a driver with the specified driver name, then it performs the operation of S3803. In S3803, the driver install module determines whether or not the version of the existing driver in the client unit is older than that of the driver specified in the driver setup information for updating. In S3803, if the installer (transmission controlling means) in the install server unit 385 determines that the version of the existing driver in the client unit is older than that of the driver specified in the driver setup information for updating, it controls the distribution operation of the OS by instructing the OS to send a driver distribution notice in S3804. Having received the instruction from the driver install module, the OS, if it receives an ACK response from the client unit in S3805, sends the driver information to the client unit S3807, and then the processing is terminated. If an ACK response is not received from the client unit in S3805, the installer in the install server unit 385 indicates an error, and then the processing is terminated. By repeating the above described processing for each PC, a driver can be actively distributed to a plurality of PCs from the server side without any request from the client side.

With the processing described above, deleting and updating of drivers can be accomplished just by giving a setup instruction once, thus greatly reducing the workload for updating drivers. Also, by keeping track of a driver name and version information in the client unit through setup status information, a driver that need to be newly incorporated into the client unit can be selectively distributed.

Figure 10:
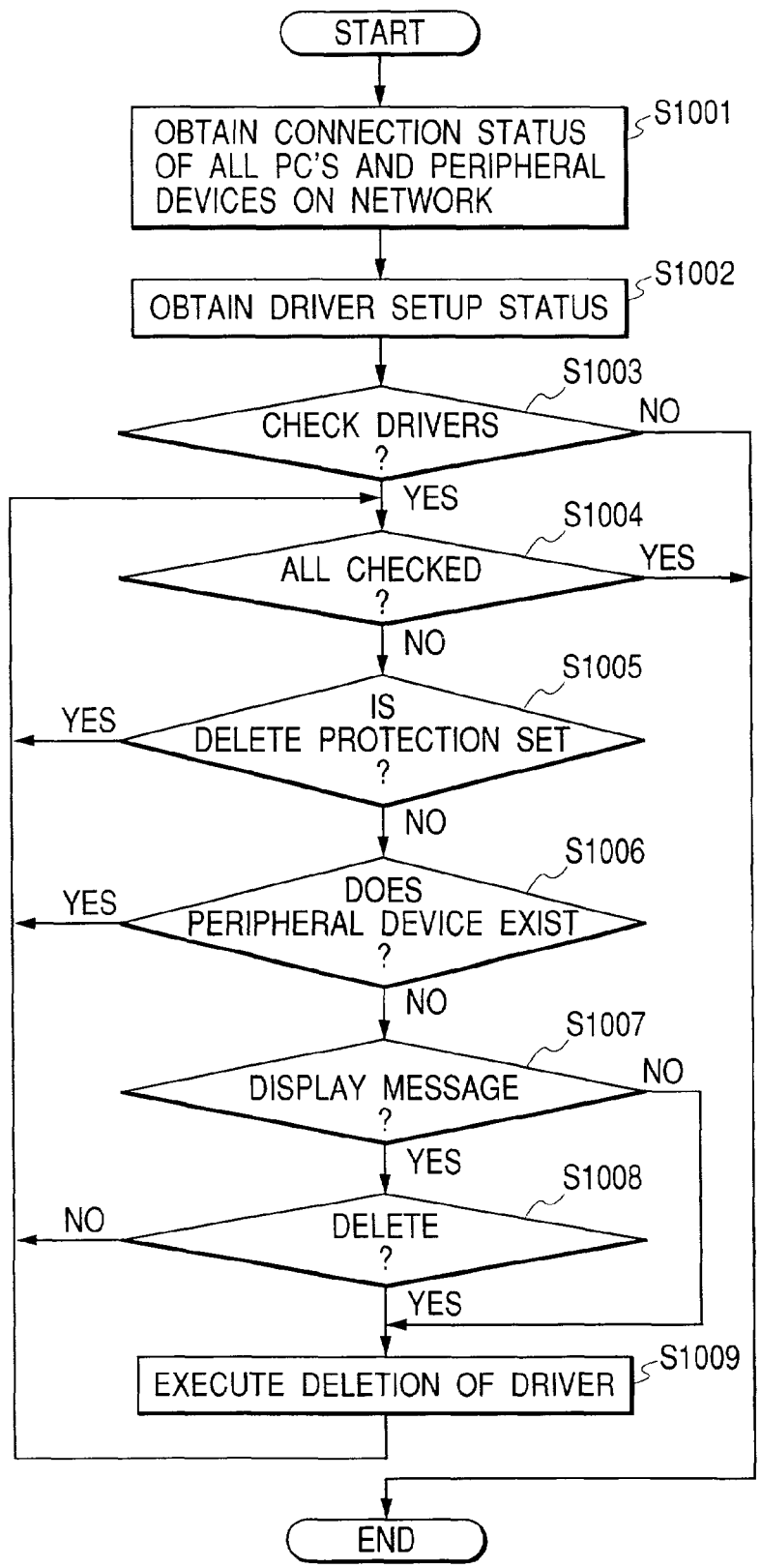
FIG. 10 is a flow chart showing processing to check and possibly delete a driver.

In the following, with reference to FIGS. 10 to 19, cases where drivers for peripheral devices are checked, and possibly deleted will be described. FIG. 10 is a flow chart showing processing to check and possibly delete a driver. First, in step S1001, the connection status information of all the client units and peripheral devices on the network is obtained and stored.

Next, in step S1002, the setup status information of the drivers installed on the user's machine for peripheral devices is obtained. Drivers for peripheral devices are those for a printer, a scanner, a digital camera, a FAX machine, and the like.

FIG. 11 shows an exemplary driver information structure being set up. It consists of an IP address, an OS type, a user name, the number of device drivers, and information for each device driver. The information for each device driver consists of a device type such as "printer" or "scanner", a driver name, version information, an output port, and sharing information. For example, for the first registered printer, the driver name is LASER-830, the version is 1.00.00, the output port is local connection, and the sharing information is indicating a sharing configuration (ON).

Figure 12:
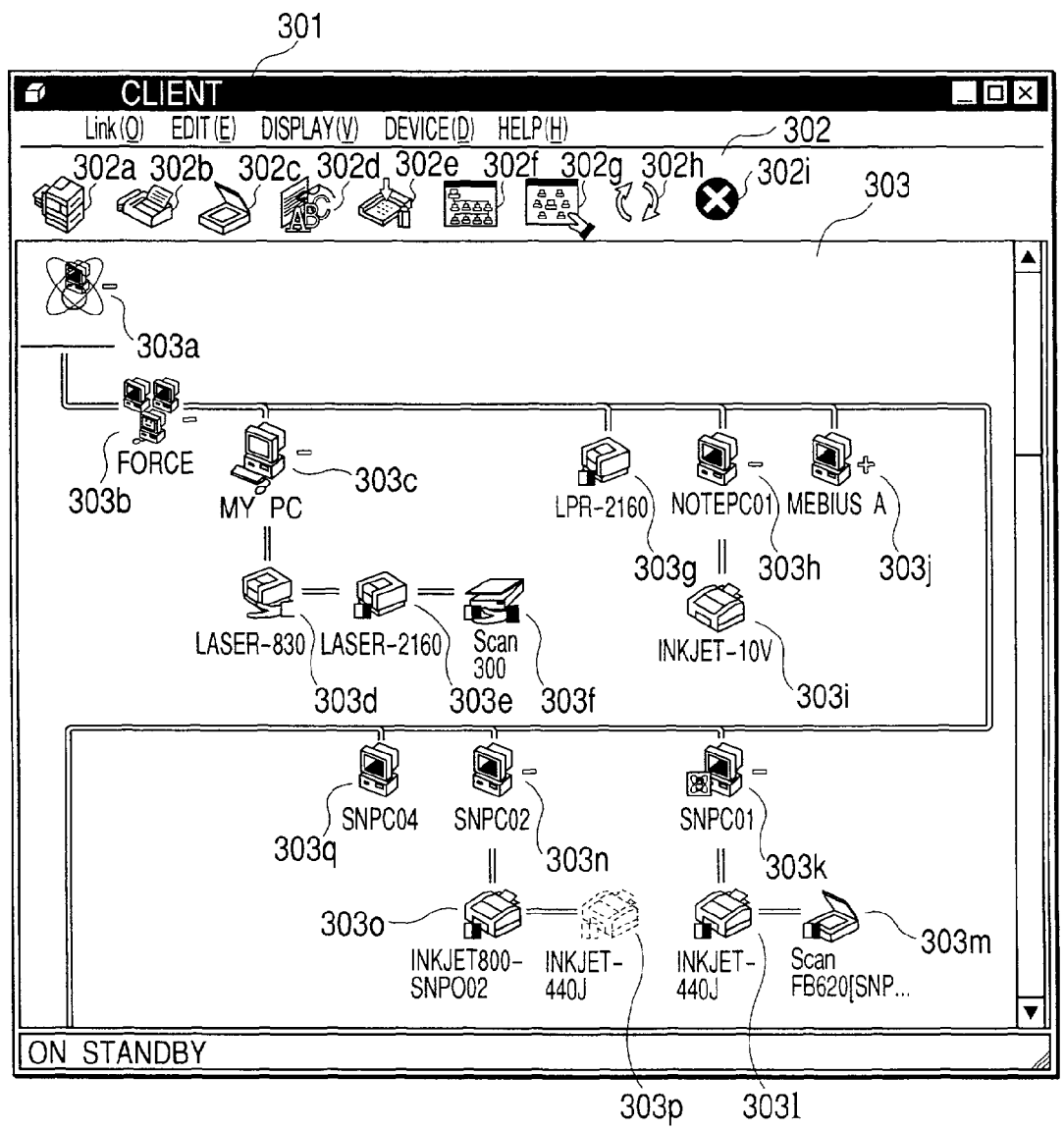
FIG. 12 shows an exemplary screen displaying PCs and peripheral devices on a network.

FIG. 12 shows an exemplary screen displaying PCs and peripheral devices on a network. Reference numerals 301, 302, and 303 respectively denote a menu, a toolbar, and a main window in which icons representing PCs and peripheral devices are displayed.

Reference numerals 302$a$ to 302$i$ denote icons representing respective functions to be performed by operating PCs and peripheral devices at the toolbar 302. For example, the icon 302$a$ is one for executing a copy function to read image data from a selected scanner and output the image data to a selected printer. The icons 302$b$, 302$c$, 302$d$, 302$e$, 302$f$, 302$g$, 302$h$, and 302$i$ are respectively those for executing a FAX function, an image data reading function, an image data reading function with OCR processing, a function to manage FAX receive data and distribution data, a display switching function, a screen display editing function, an information updating function, and a function to terminate updating.

Reference numerals 303$a$ to 303$q$ denote icons representing PCs and peripheral devices shared on the network. These icons 303$a$ to 303$q$ are displayed in different forms according to device types such as "PC", "printer", "scanner", and "FAX modem", or device status such as "processing", and "error has occurred". The icon 303$c$ is one that represents a user's own machine, while the icon 303$b$ is one representing the domain where the user's machine is logged on. Since a user's own machine is a special one, it is displayed at the top to distinguish it from other PCs. Other PCs are displayed in ascending or descending alphabetical order.

Also, icons such as the icon 303$p$ representing PCs and peripheral devices which are shared on the network, but on which drivers are not installed, are displayed in gray. Also, icons such as the icon 303$j$ with connected devices, which nevertheless are not displayed in expansion, are displayed with "+" marks, while those such as the icon 303$h$, 303$k$, 303$n$ displayed in expansion are displayed with "−" marks. Those having no connected devices such as the icon 303$q$ bear no marks.

In this manner, the connection states, and furthermore status of all the PCs and peripheral devices in the network can be checked on the screen. In this example, because of the limited space on the screen, not all the icons are displayed. But, it is possible to see the existence of all the PCs and peripheral devices using the scroll bar located at the side of the screen.

Figure 13:
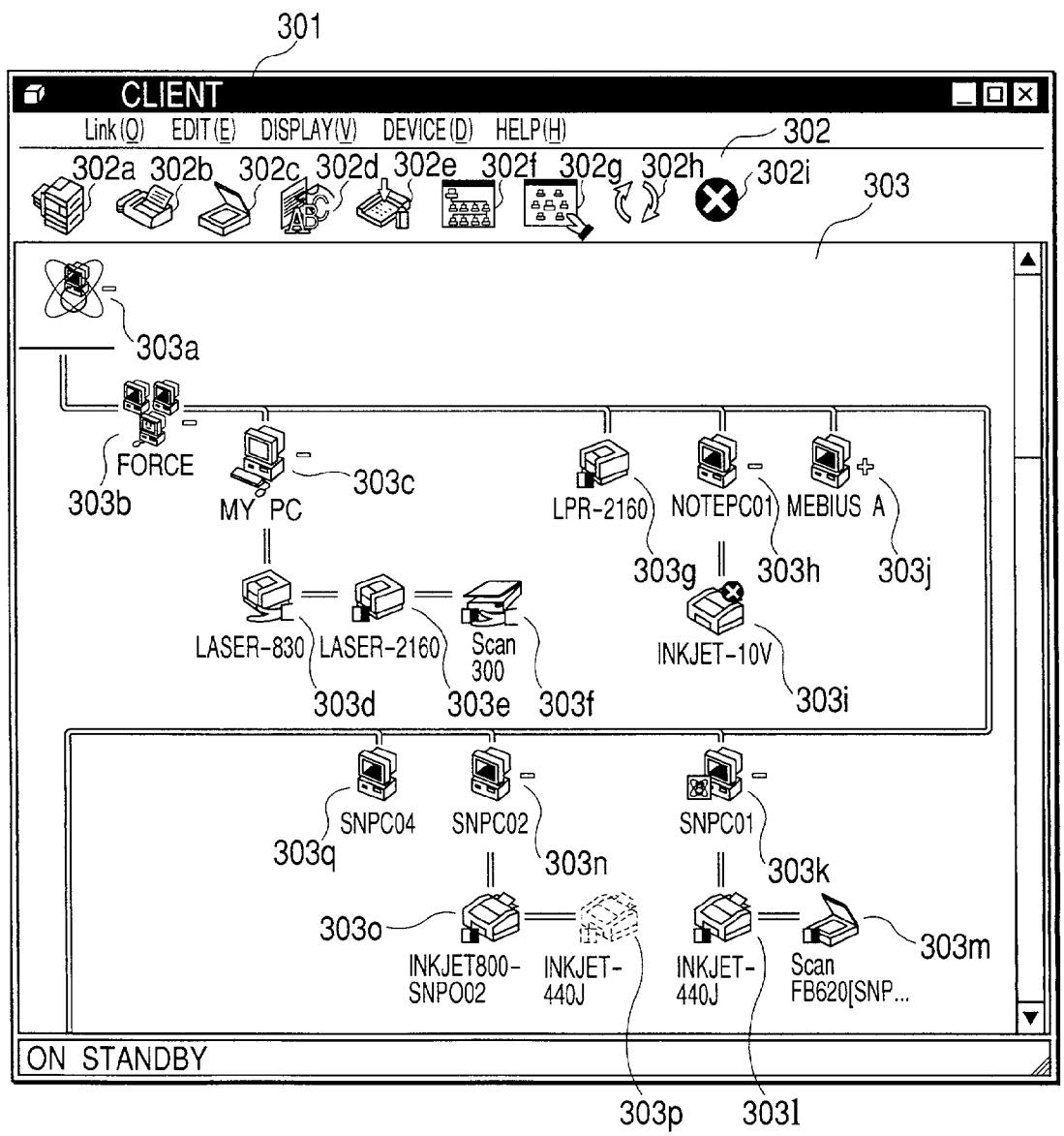
FIG. 13 shows an exemplary screen to be displayed when the printer sharing configuration represented by the icon 303$i$ is cleared or when a driver is deleted.

FIG. 13 shows an exemplary screen to be displayed, updated from the state shown in FIG. 12, when the sharing configuration is cleared for the printer that is represented by the icon 303$i$ and that is configured for sharing on the network, being connected to the PC represented by the icon 303$h$, or when a driver is deleted. As shown in this drawing, at the icon 303$i$ is displayed a "x" mark to represent "disabled". In this state, though a driver is installed, output is not possible since there is no actual output point.

Returning to the flow chart in FIG. 10, in step S1003, whether or not to check drivers for peripheral devices is determined. For example, a driver checking instruction can be given by selecting devices to be checked, with a screen as shown in FIG. 14 being displayed. On this screen, one can also set whether or not to display a message when a driver is determined unnecessary during the checking, with a corresponding device not being found. If there is no driver checking instruction, the processing is terminated.

If there is a driver checking instruction, the processing proceeds to step S1004, where a determination is made as to whether all the drivers targeted for checking have been checked. If all the drivers have been checked, then this processing is terminated.

If not all the drivers have been checked, the processing proceeds to step S1005, and a determination is made as to whether or not drivers to be checked have been set for delete protection. For example, when checking is performed on a routinely used printer, it would be inconvenient for the user if the driver were to be deleted as not having a corresponding device just because the power supply happened to be turned off, requiring the user to install the driver again afterward.

Therefore, drivers that should not be deleted are allowed to have a delete protection setting. FIG. 15 shows an exemplary screen for setting delete protection for a driver. There, a delete protection setting can be made by selecting drivers to be protected and adding them to the registration on the protection list. On the other hand, it is also possible to select drivers to be taken off from the delete protection to delete them from the protection list.

In step S1005, if the protection is on, the processing returns to step S1004, where the next driver is checked. If it is not protected, the processing proceeds to step S1006, where a determination is made as to whether or not there is a device corresponding to the driver. For example, in the case of a printer, the determination is made by a query to the output port to see if there is any response. In the case of a scanner and the like, checking is performed by a similar operation on the input port. If there is a target device, the processing returns to step S1004, where the next driver is checked.

If there is no target device, then the processing proceeds to step S1007, where a determination is made as to whether or not to display a delete message. This determination will be made based on the information set in step S1003. If there is a setting to display a message, the processing proceeds to step S1008. If there is a setting not to display a message, the processing proceeds to step S1009.

Figure 16:
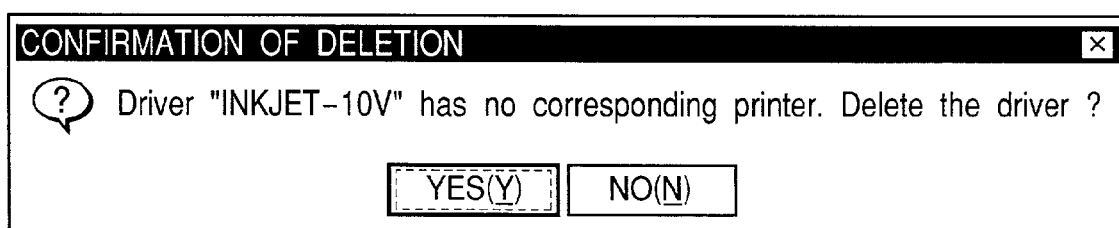
FIG. 16 shows an exemplary message to be displayed when a driver to be deleted is found.

In step S1008, a message is displayed prompting the user to indicate whether or not to execute the deletion. FIG. 16 shows an exemplary message to be displayed when a driver to be deleted is found. With a target driver being displayed in this manner, the user indicates whether or not to delete it. If "YES" is indicated, the processing proceeds to step S1009. If "NO" is indicated, the delete operation is cancelled, and the processing returns to step S1004, where the next driver is checked.

In step S1009, the delete operation for the specified driver is executed. After the operation, the processing returns to step S1004, where the next driver is checked.

Figure 17:
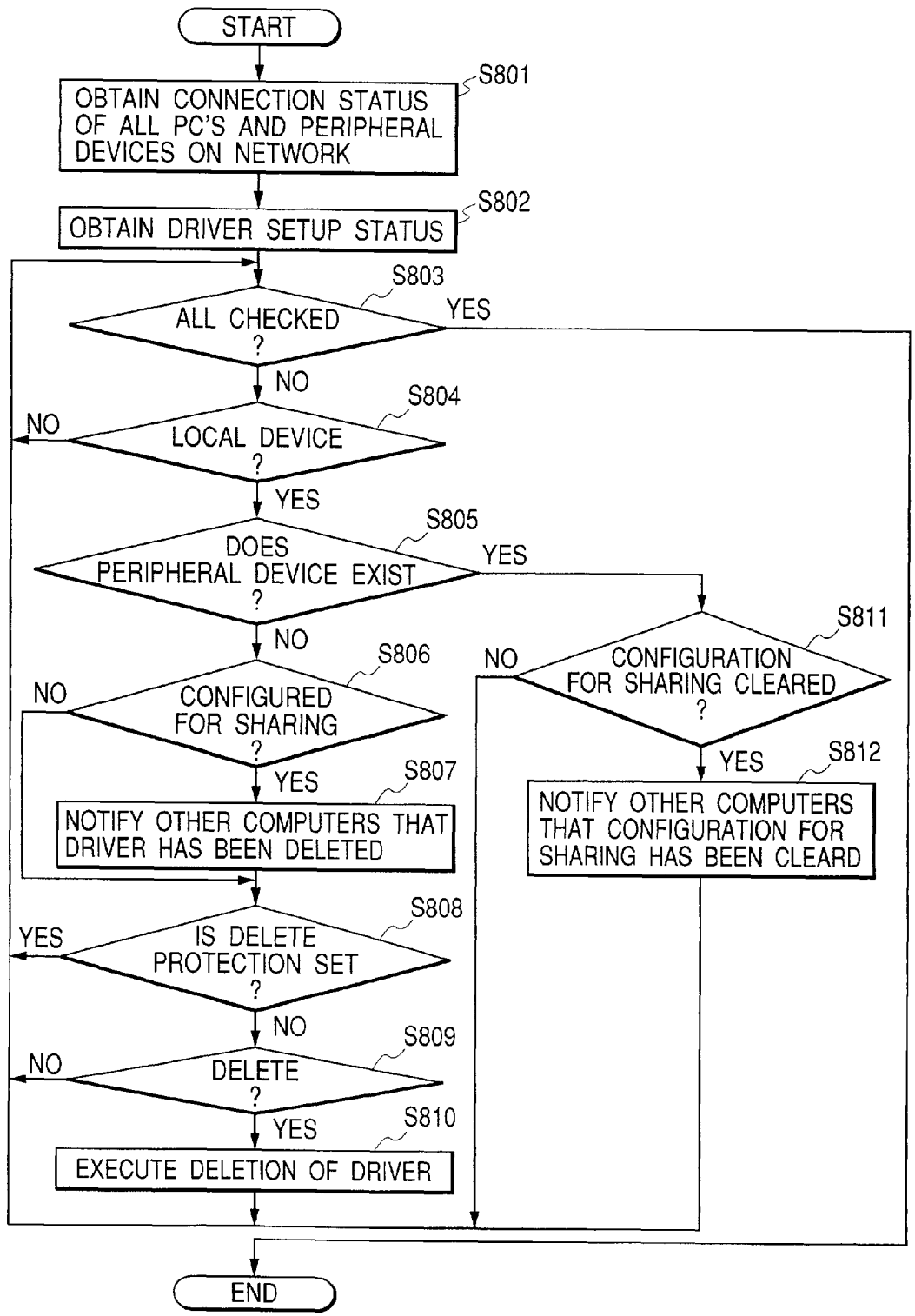
FIG. 17 is a flow chart showing processing to check a driver, and further showing processing to delete a driver.
Figures 18, 19:
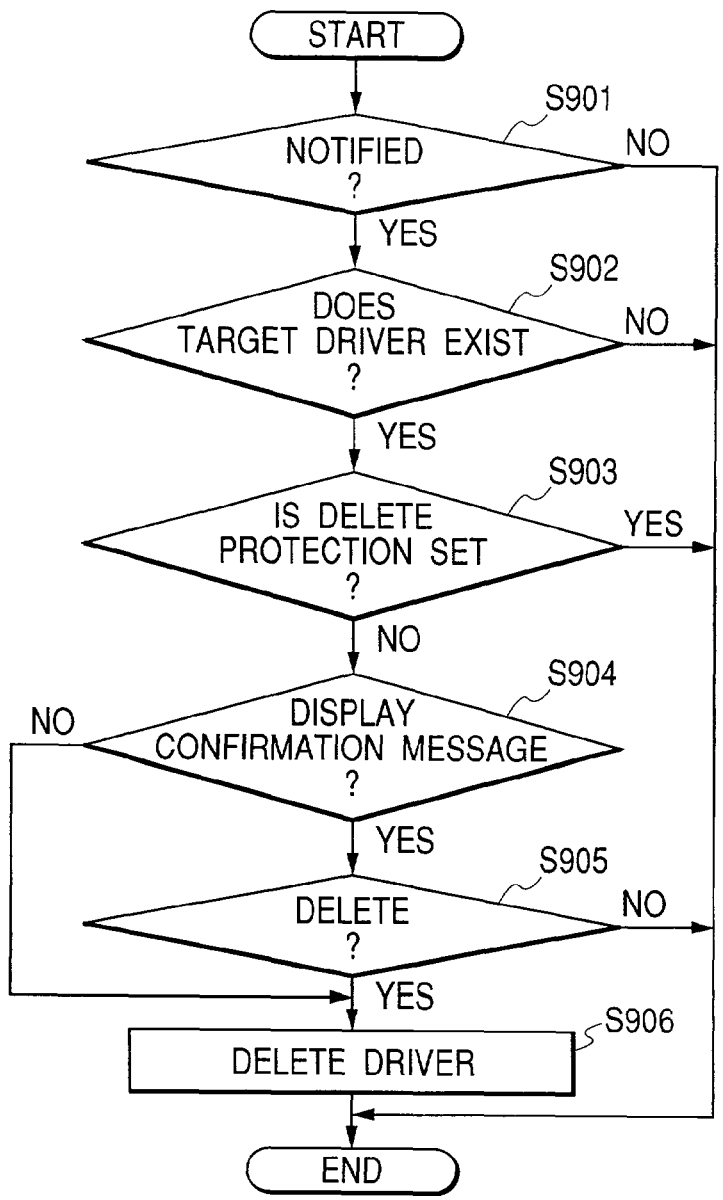
FIG. 18 is a flow chart showing processing to be performed when driver deletion is notified.
FIG. 19 shows an exemplary information structure for notifying driver deletion.

In a flow chart shown in FIG. 10, while driver checking is performed at a computer provided with a device in a sharing configuration, cases where an instruction to delete a driver is given at a computer provided with a device in a sharing configuration may also be envisioned. FIGS. 17 and 18 show flow charts for cases where an instruction to delete a driver is given at a computer provided with a device in a sharing configuration.

First, steps S801 and S802 represent operations similar to those represented by steps S1001 and S1002. In step S803, whether or not all the installed drivers have been checked is determined. If all the drivers have been checked, this processing is terminated.

If not all the drivers have been checked, the processing proceeds to step S804, where a determination is made as to whether the device corresponding to the driver is a local device or whether it is a device shared on the network. If it is not a local device, the processing returns to step S803, where the next driver is checked.

If it is a local device, the processing proceeds to step S805, where a determination is made as to whether or not there is a device corresponding to the driver. The method of determination is similar to the one in step S1005. If there is a device corresponding to the driver, the processing proceeds to step S811.

If there is no device corresponding to the driver, the processing proceeds to step S806, where a determination is made as to whether or not that driver has a sharing configuration. If it does not have a sharing configuration, the processing proceeds to step S808.

If it has a sharing configuration, the processing proceeds to step S807, where other computers are notified of the fact that the target device has been disabled through the network, and the processing proceeds to step S808. FIG. 19 shows an exemplary information structure for notifying driver deletion, the structure carrying such information as a device type, a driver name, version information, and an output port.

In step S808, whether or not the target driver is set for delete protection is determined. The method of determination is similar to the one in step S1005. If it is set for delete protection, the processing returns to step S803, where the next driver is checked.

If it is not set for delete protection, the processing proceeds to step S809, where a determination as to whether or not to execute the deletion is determined. The method of determination is similar to the one in step S1008. If the driver deletion is cancelled at this point, the processing returns to step S803, where the next driver is checked.

If the execution of the driver deletion is indicated, the processing proceeds to step S810, where the operation to delete the driver is executed, and after the operation is completed, the processing returns to step S803, where the next driver is checked.

In step S811, whether or not the sharing configuration for the target driver has been cleared is determined. If the sharing configuration for the target driver has not been cleared at this point, the processing returns to step S803, where next driver is checked.

If the sharing configuration for the target driver has been cleared, the processing proceeds to step S812, where other computers are notified of the fact that the target device has been disabled through the network.

A computer receiving a driver deletion notice as described above in turn, first, determines whether or not it has received a deletion notice in step S901 as shown in FIG. 18. If it has not received a notice, the processing is terminated.

If it has received a notice, the processing proceeds to step S902, where a determination is made as to whether or not there is a driver corresponding to the driver deletion notice. If there is no corresponding driver, the processing is terminated.

If there is a corresponding driver, the processing proceeds to step S903, where a determination is made as to whether or not the target driver is set for delete protection. The method of determination is similar to the one in step S1005. If it is set for delete protection, the processing is terminated.

If it is not set for delete protection, the processing proceeds to step S904, where a determination is made as to whether or not to display a message. If there is no setting to display a message, the processing proceeds to step S906. If there is a setting to display a message, the processing proceeds to a step S905, and a message is displayed.

Then, if the deletion is not indicated in step S905, the processing is terminated. If the deletion is indicated, the processing proceeds to step S906, where the target driver is deleted, and then the processing is terminated.

As stated above, at the screen on which client units and peripheral devices shared on the network are displayed, when a peripheral device shared on the network is disabled by deletion or by clearing of the sharing configuration, one can easily uninstall the driver that has become unnecessary with a simple operation. Also, when a driver for a peripheral device with a sharing configuration is deleted, or when the sharing configuration is cleared, by informing other computers, the driver that has become unnecessary can be deleted. With these features, work efficiency on the network can be greatly improved.

Figure 20:
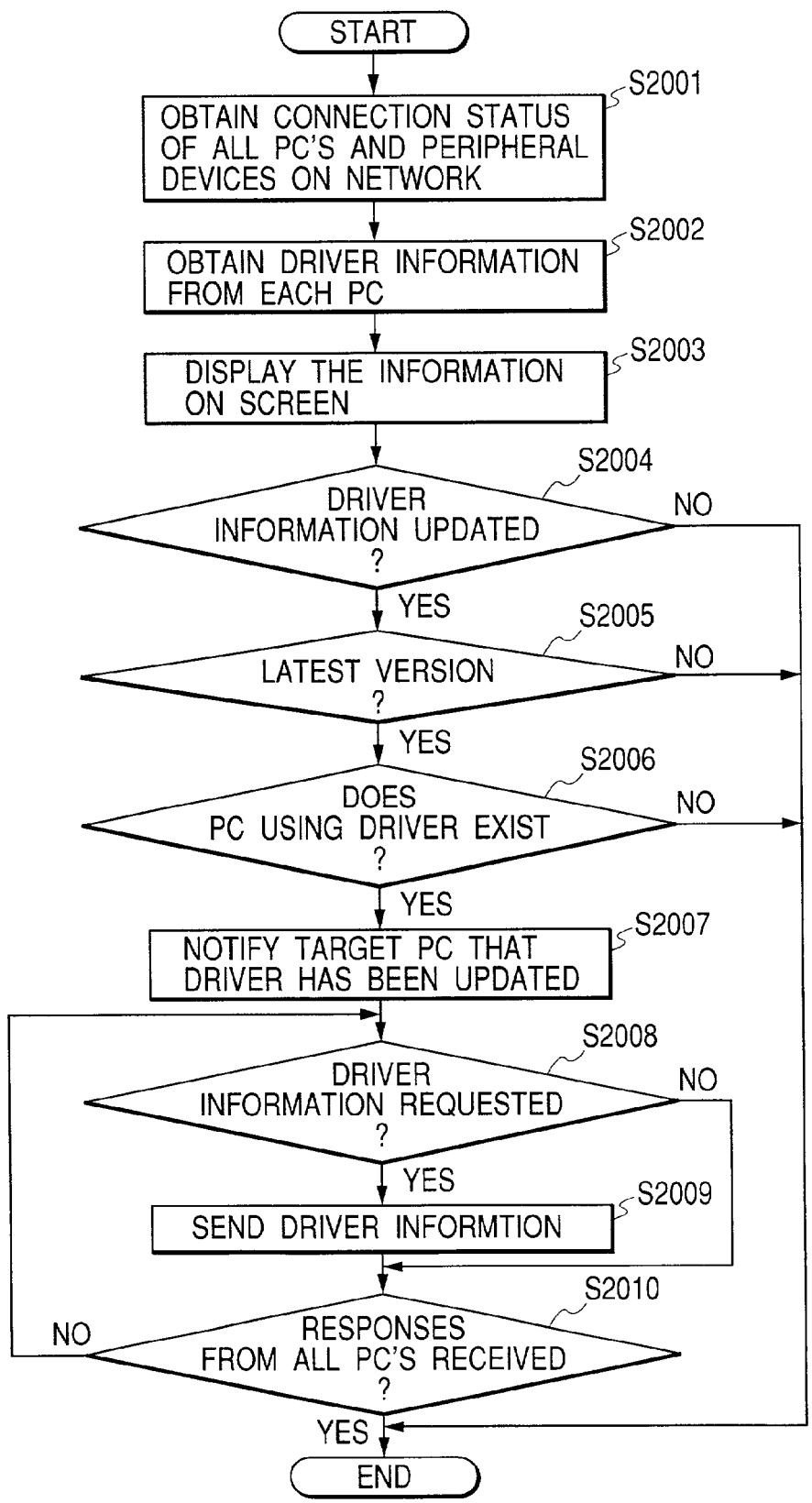
FIG. 20 is a flow chart showing processing for upgrading the version of a driver.

In the following, cases are described where version upgrading for the driver of a peripheral device is performed with reference to FIGS. 20 to 31. FIG. 20 is a flow chart showing processing for upgrading the version of a driver. First, in step S2001, the connection status information of all the client units and peripheral devices on the network is obtained and stored.

Next in step S2002, the setup status information of the drivers in each client unit for peripheral devices is obtained. Drivers for peripheral devices are those for a printer, a scanner, a digital camera, a FAX machine, and the like. As a method of obtaining setup status information, for example, on each PC, a module that obtains driver information installed on its own machine can be envisioned so that when invoked, it collects information and communicates the information via the network.

FIG. 21 is en exemplary driver information structure being set up. It consists of an IP address, an OS type, a user name, the number of device drivers, and information for each device driver. The information for each device driver consists of a device type such as "printer" or "scanner", a driver name, version information, an output port, shared name, and a driver information address. For example, for the first registered printer, the driver name is LASER-830, the version is 1.00.00, the output port is local, the shared name is LASER-830, and the driver information address is 0x10000. This information is stored in each client unit.

In step S2003, the connection status information of all the client units and peripheral devices in the network is displayed based on the obtained information. Since this screen display is already described in relation to FIG. 12, it will not be described in detail.

Figure 22:
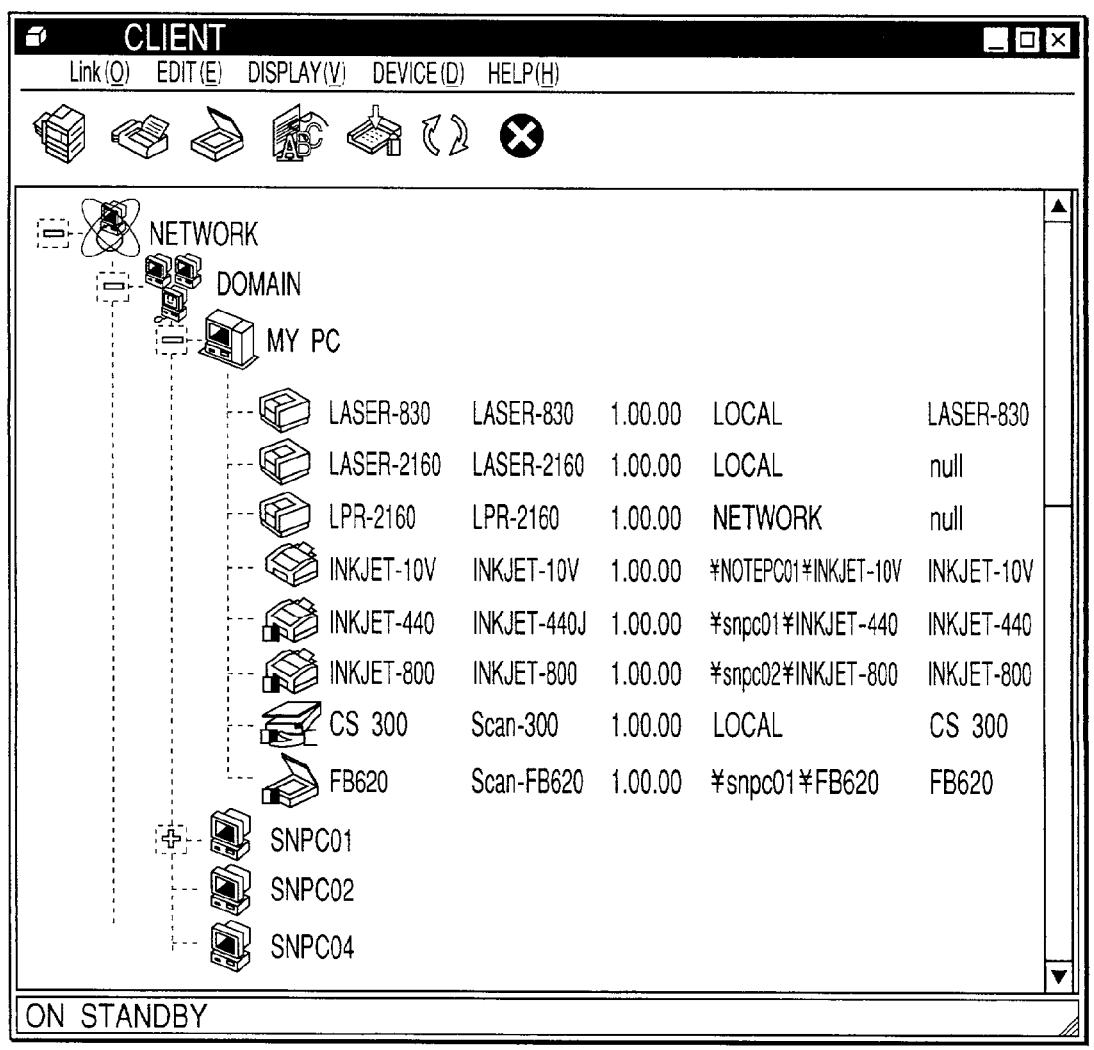
FIG. 22 shows an exemplary screen displaying the driver setup status of each client unit on a network.

FIG. 22 shows an exemplary screen displaying the driver setup status of each client unit on a network. This is displayed based on the driver information structure obtained from each client unit. For example, in this drawing, as drivers installed in my client unit, there are 6 for printers and 2 for scanners. Among these, for example, the printer named "INKJET-10V" is shown with a driver name, "INKJET-10V", a version number, "1.00.00", a port name, "¥¥NOTEPC01¥INKJET-10V", being configured for sharing on the network with the name "INKJET-10V".

Returning to the flow chart in FIG. 20, in step S2004, whether or not drivers for peripheral devices have been updated is determined. If drivers have not been updated, the processing is terminated. If the drivers have been updated, the processing proceeds to step S2005. A method of updating drivers can be envisioned in which drivers are updated on each client unit, registering that driver information with a PC to serve as the server unit. In this embodiment, for the server unit as well as for the client units, PCs as exemplary information processing units are used. Alternatively, another method can be envisioned in which the user registers the newest drivers after downloading them from sites of their respective manufacturers. Furthermore, checking of driver versions may be performed at particular locations on the network specified by the user in advance. FIG. 23 shows an exemplary screen for making settings for driver version checking. By setting a particular URL in advance as shown in the drawing, a setting to perform regular driver version checking can be made, thus obtaining a new version automatically when the driver is updated.

In step S2005, whether the updated driver is the newest version or not is determined. If it is not the newest version, the processing is terminated since there is no need to send an updating notice. If it is the newest version, then the processing proceeds to step S2006. A method of determining a driver version can be envisioned in which the determination is made based on the driver information for each printer managed by the server unit. FIG. 24 shows an exemplary structure in which a version is managed for each driver. It consists of a device type such as "printer" or "scanner", a device driver name, the number of version information items being managed, driver version information, and corresponding driver information. A determination is made by comparing the version information being managed to the version information for the updated driver.

Figures 25, 26:
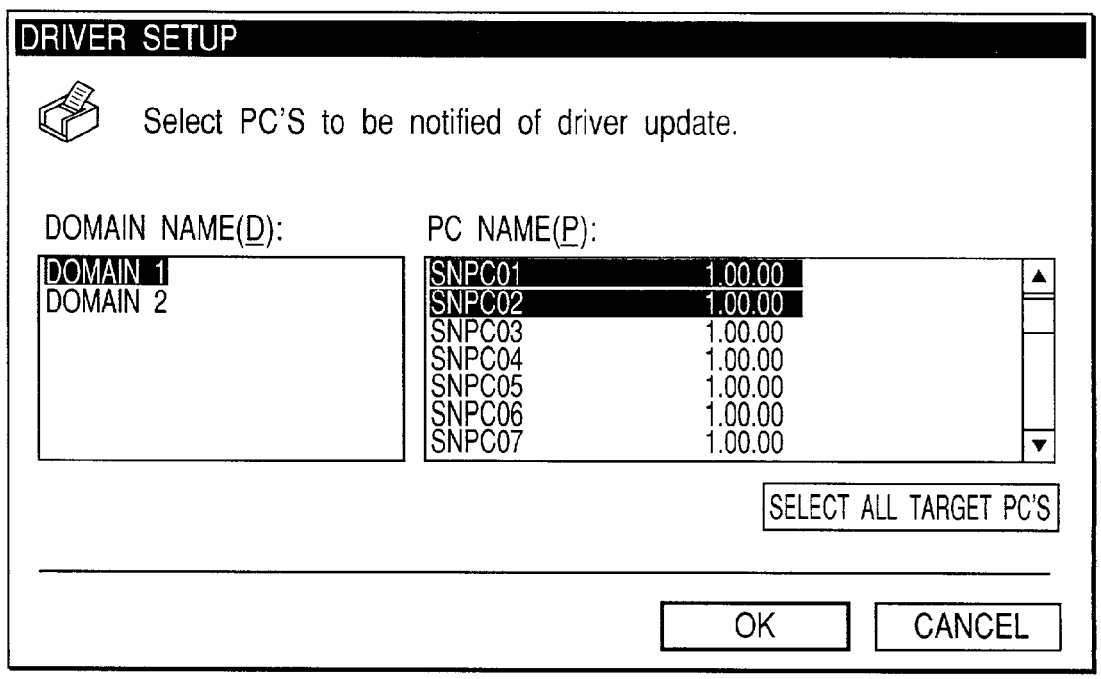
FIG. 25 shows an exemplary screen for selecting client PCs on which a driver is to be updated.
FIG. 26 shows an exemplary information structure for notifying driver updating.

In step S2006, whether or not there is a client unit using the updated driver is determined. The determination is made using a driver device information structure obtained from each client unit. If no target client unit is found at this point, the processing is terminated. If target client units are found, the list of target client units is displayed. FIG. 25 shows an exemplary screen for selecting client units on which a driver is to be updated. If "OK" is selected there, after selecting target client units, the processing proceeds to step S2007, where a notice is sent to the selected target client units. Also, if the user selects "all the target PCs", all the target client units will be selected.

In step S2007, the selected target client units are notified of the fact that a driver is updated. FIG. 26 shows an exemplary information structure for a device updating notice. This structure consists of a device type, a driver name, version information, and an output port.

The processing proceeds to step S2008, where a determination is made as to whether or not there are requests to obtain the driver information from the client units that have been notified. If there are no requests or if there are responses from the clients that there is no need for sending the driver information, the processing proceeds to step S2010. If there are requests, the processing proceeds to step S2009, where the driver requested information is sent to requesting clients.

In step S2010, whether responses have been received from all the client units notified is determined. If responses have been received from all the client units, the processing is terminated. If responses have not been received from all the client units yet, the processing returns to step S2008.

Figure 27:
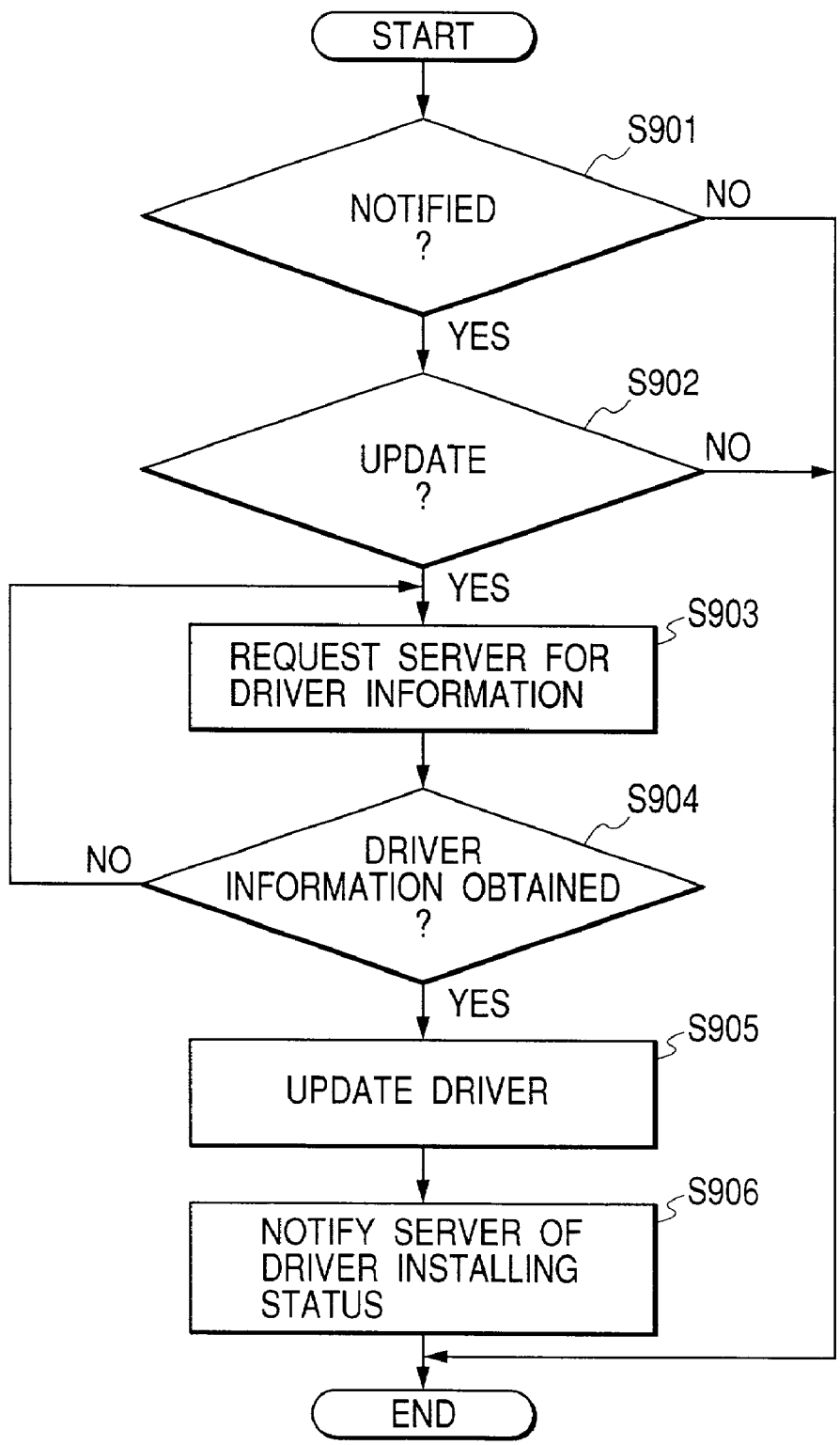
FIG. 27 is a flow chart showing processing to upgrade the version of a driver.

Turning now to FIG. 27, it shows a flow chart for processing in the client. First, in step S901, whether or not there has been a driver updating notice from the server unit is determined. If no notice has been received, the processing is terminated.

Figure 28:
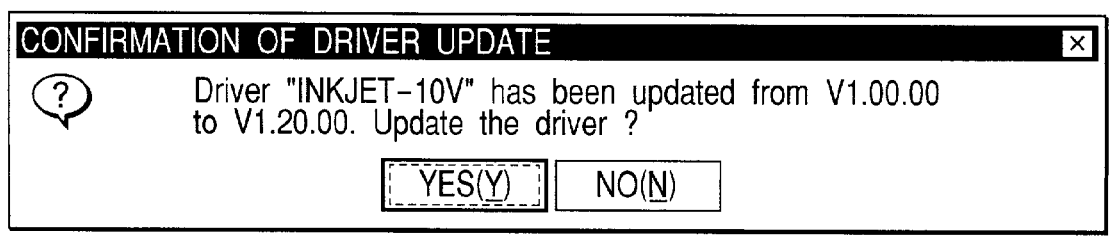
FIG. 28 shows an exemplary message to notify that a driver has been updated.

If a notice has been received, the processing proceeds to step S902, where a determination is made as to whether or not to update the driver. For example, a method can be envisioned in which the user gives an instruction, the receiving of a driver updating notice being indicated by a message. FIG. 28 shows an exemplary message to notify that a driver has been updated. If "NO" is selected there, the processing is terminated, notifying the server unit that the target driver information is not necessary. If "YES" is selected, the processing proceeds to step S903, where a request for the target driver information is made to the server unit.

Next, in step S904, whether the driver information has been obtained or not is determined. If it has not been obtained, the processing returns to step S903, where the request for acquisition is repeated to the server unit. If the driver information is obtained, the processing proceeds to step S905, where the driver updating operation is performed. Then, after informing the server unit of the newest driver install status in step S906, the processing is terminated.

Figure 29:
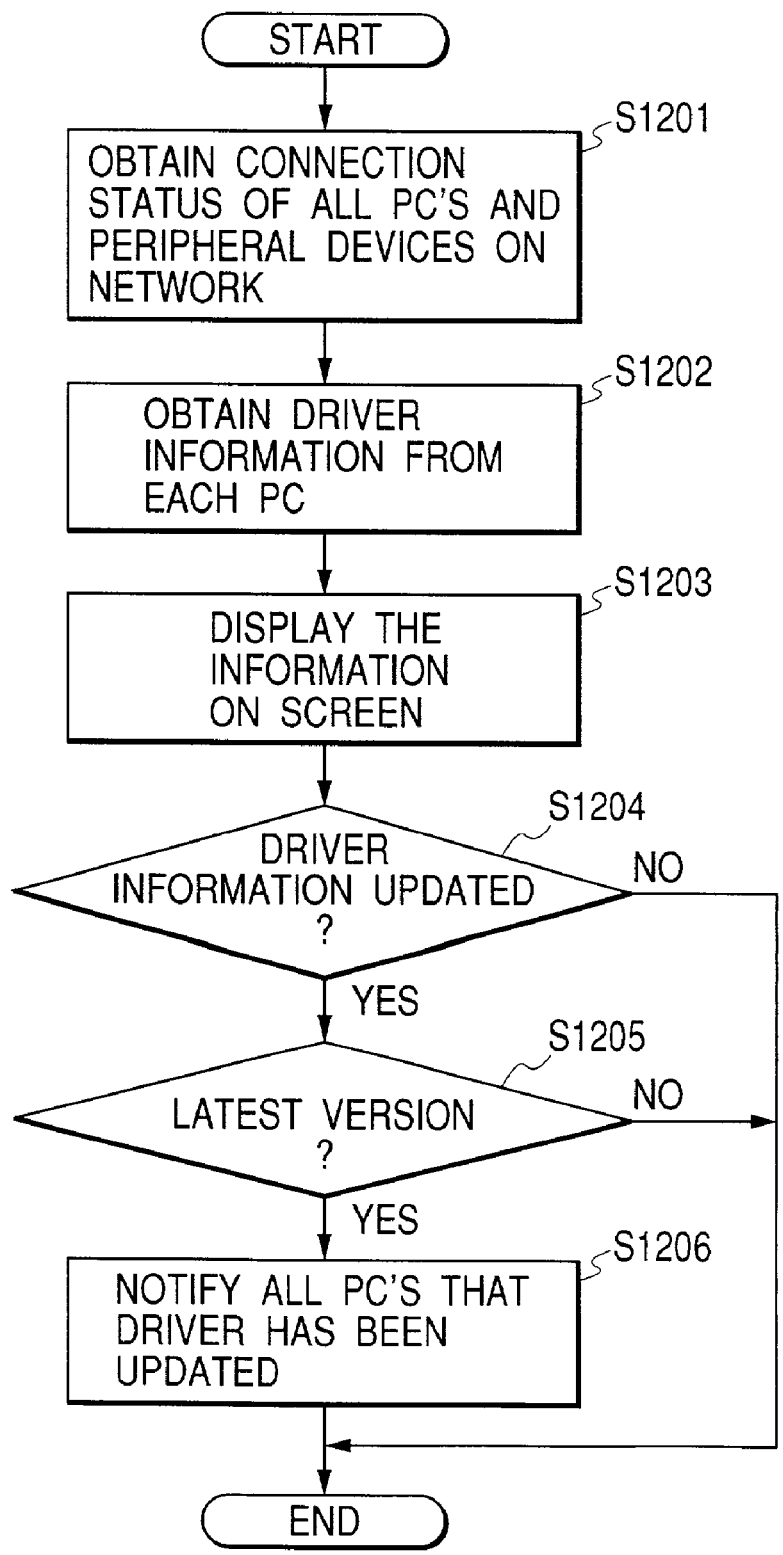
FIG. 29 is a flow chart showing processing to upgrade the version of a driver.
Figure 30:
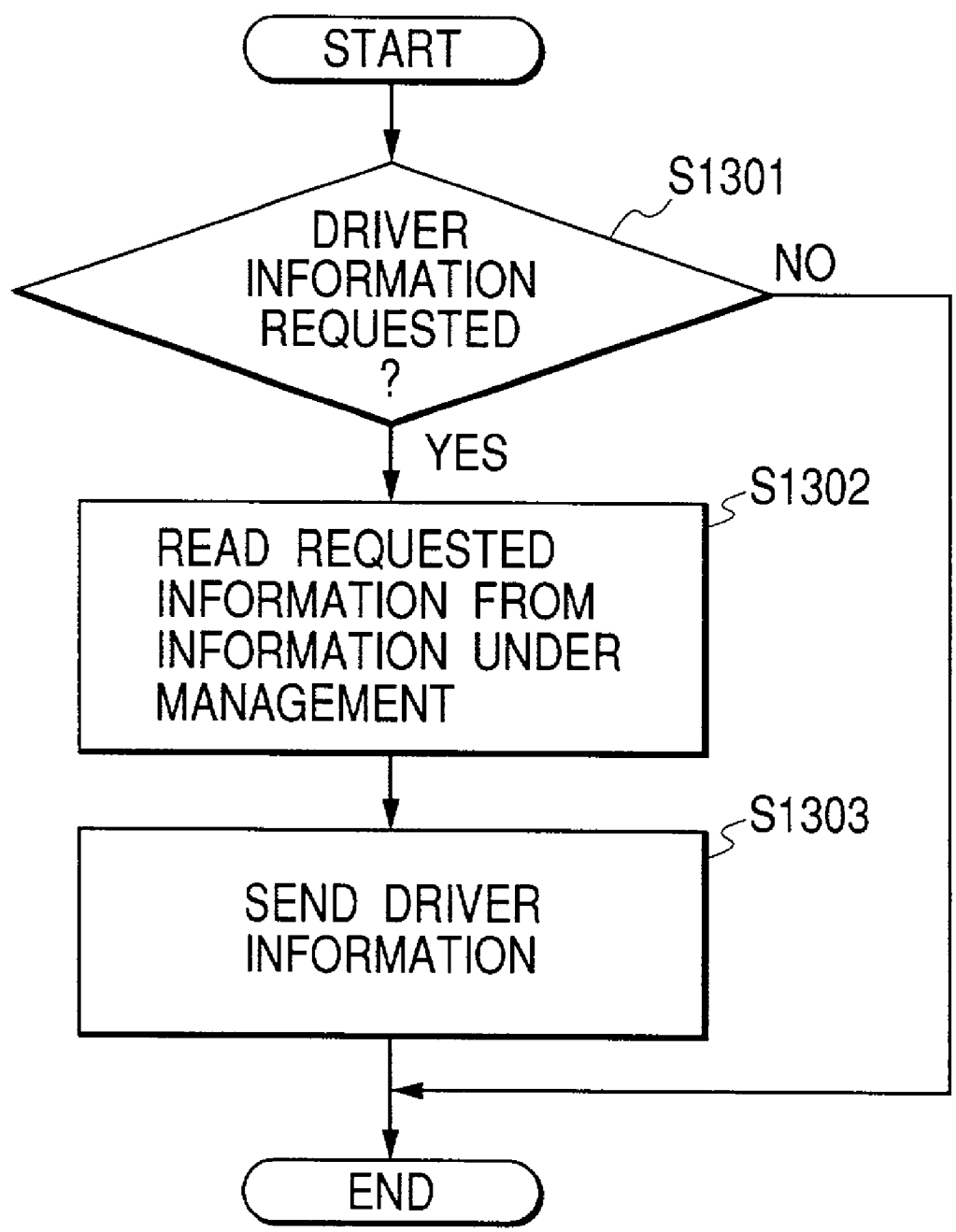
FIG. 30 is a flow chart showing processing to upgrade the version of a driver.
Figure 31:
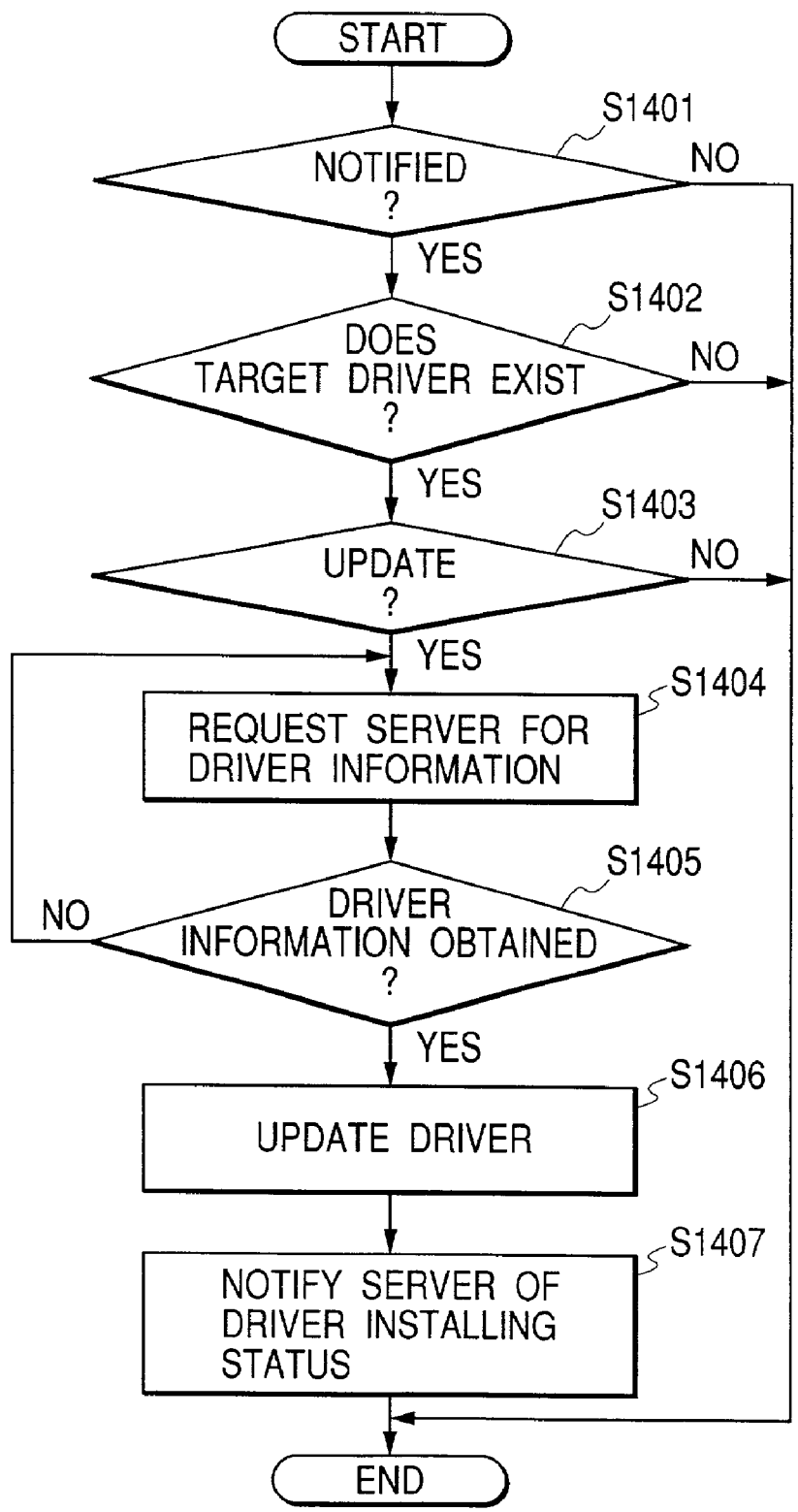
FIG. 31 is a flow chart showing processing to upgrade the version of a driver.

While in the flow charts shown in FIGS. 20 and 27, the selection of client units to be notified is performed at the PC serving as the server unit, a case may also be contemplated where a driver updating operation is performed based on a determination of the status of the driver installed on the user's PC serving as a client unit. FIGS. 29 to 31 shows a flow chart where a driver updating operation is based on a determination of the status of the driver installed on the user's PC serving as a client.

Steps S1201 to S1205 in FIG. 29 are similar to steps S2001 to S2005. Then, in step S1206, after notifying all the client units of the fact that a driver has been updated, the processing is terminated. Also, the information structure to be notified is as shown in FIG. 26.

Then, a request from a client is processed in accordance with the flow chart shown in FIG. 30. First, in step S1301, whether or not there is a request for driver information is determined. If there is no request, the processing is terminated.

If there is a request, the processing proceeds to step S1302, where requested driver information is read from the driver information being managed. Then, in step S1303, the driver information is sent to requesting clients.

At the client, the processing proceeds in accordance with the flow chart shown in FIG. 31. This flow chart is approximately the same as the flow chart shown in FIG. 27, with step S1401 and steps S1403 to 1407 corresponding to steps S901 to S906 described with reference to FIG. 27. Only a determination involved in step S1402 is different.

In this step S1402, if a driver updating notice is received from the server unit, necessary data is read from the driver updating notice structure, and by comparing the data with the information for the driver installed on the user's machine, whether a driver corresponding to the notice exists or not is determined. If the target driver is not found, the processing is terminated ignoring this notice. If the target driver is found, the processing similar to the one shown in FIG. 27 is performed.

As described above, at the screen on which client units and peripheral devices shared on the network are displayed, when a driver for a peripheral device is updated, one can perform the processing for updating the driver with a simple operation. Also, since only a driver updating information notice need to be sent to each client unit in determining whether or not to perform the processing for updating a driver, traffic on the network can be reduced to the minimum. These features allow work efficiency on the network to be greatly improved.

A case where various devices are operated according to a program stored in a computer (CPU or MPU) of a unit or system also falls within the scope of the invention, the program code for implementing the features of the above described embodiments being supplied in software to the computer of the unit or system, and the computer being connected to the various devices to operate them in a manner to implement the features of the above described embodiments.

In this case, it is the above described software program code itself that implements the features of the above described embodiments, the program code itself and means for providing a computer with the program code such as, for example, a storage medium storing such program code constituting the invention. For a storage medium for storing for storing such program code, for example, a floppy disk, a hard disk, optical disk, magneto-optical disk, CD-ROM, magnetic tape, a non-volatile memory card, and ROM can be used.

In addition to the case where the features of the above described embodiments are implemented by the execution of program code supplied to a computer, needless to say, the invention also includes a case where the features of the above described embodiments are implemented by the program cooperating with an OS (Operating System), other application software, or the like running on the computer.

Needless to say, the invention further includes a case where the features of the above described embodiments are implemented by a CPU or the like provided on a feature expansion board or unit executing part or the whole of processing based on instructions of program code, the supplied program code being stored in memory provided on a feature expansion board or unit of a computer.

The form and structure of each part shown in any of the above described embodiments are but examples for illustrating how to implement the invention, and they should not be construed as limiting the scope of the invention. That is, the invention can be implemented in various ways without departing from the spirit or the main features of the invention. As stated above, according to the invention, at the screen on which client units and peripheral devices shared on the network are displayed, if it is found that a driver for a peripheral device is not installed, one can install the driver with a simple operation, and also check if it has been successfully installed, thus greatly improving work efficiency in the network.

According to an embodiment of the invention, at the screen on which client units and peripheral devices shared on the network are displayed, if it is found that a driver for a peripheral device is not installed, the system administrator can remotely install the driver from the server unit with a simple operation, and also check to see if the driver has been correctly installed by having the printer execute test printing, thus improving work efficiency.

As described above, the invention has an advantage of alleviating the workload involved in setting up information by allowing driver information for a client unit to be set up with a simple operation.

In addition, it has an advantage of allowing the user to perform driver install operations without paying attention to the driver setup status of each unit since a driver install operation is performed in a printing system comprising a plurality of client units in accordance with the setup status of each client unit on which a driver is to be installed.

In addition, it has an advantage of eliminating complicated install operations at client units since driver setup is performed by push install from the server unit to the client units without waiting for requests from the client units.

In addition, it has an advantage of making it possible to check whether driver information setup has been completed normally, providing a scheme for executing test printing after installing the driver information.

What is claimed is:

1. An information processing apparatus in communication with a plurality of client apparatuses via a network, the apparatus comprising a programmed processor that controls communications with the plurality of client apparatuses, wherein the programmed processor includes:

determining means for determining whether a remote installation of a driver is to be performed on the plurality of client apparatuses to create a set-up instruction for the driver if it is determined that the remote installation is to be performed and for determining one or more of the plurality of client apparatuses on which the driver is to be installed based on the set-up instruction;

designation means for designating, before the driver is installed, on a graphical user interface of an installer of the driver, whether test printing is to be executed after the driver installation has been correctly completed on the one or more of the plurality of client apparatuses; and transmission controlling means for, if the designation means designates that the test printing is to be executed, controlling operations to transmit, without waiting for a request for the set-up instruction from any of the plurality of client apparatuses, to each of the one or more of the plurality of client apparatuses determined by the determining means, the driver, the set-up instruction to set up the driver, and a test printing instruction stored in the set-up instruction to execute test printing to check if the driver installation has been correctly completed on the one or more of the plurality of client apparatuses, via the network, wherein, if the designation means designates that the test printing is not to be executed, the transmission controlling means controls the operations to transmit the driver and the set-up instruction, but not the test printing instruction, to each of the one or more of the plurality of client apparatuses determined by the determining means, without waiting for the request from any of the plurality of client apparatuses.

2. The information processing apparatus according to claim 1, wherein a test print request source is printed in the test printing.

3. The information processing apparatus according to claim 1, wherein a name of a print server used in executing the test printing is printed in the test printing.

4. An information processing method for an information processing apparatus in communication with a plurality of client apparatuses via a network, the method comprising:

determining whether a remote installation of a driver is to be performed on the plurality of client apparatuses to create a set-up instruction for the driver if it is determined that the remote installation is to be performed and determining one or more of the plurality of client apparatuses on which the driver is to be installed based on the set-up instruction;

designating, before the driver is installed, on a graphical user interface of an installer of the driver, whether test printing is to be executed after the driver installation has been correctly completed on the one or more of the plurality of client apparatuses; and if the designation is made that the test printing is to be executed, controlling operations to transmit, without waiting for a request for the set-up instruction from any of the client apparatuses, to each of the one or more of the plurality of client apparatuses determined, the driver, the set-up instruction to set up the driver, and a test printing instruction stored in the set-up instruction to execute test printing to check if the driver installation has been correctly completed on the one or more of the plurality of client apparatuses, via the network, wherein, if a designation is made that the test printing is not to be executed, the operations are controlled to transmit the driver and the set-up instruction, but not the test printing instruction, to each of the one or more of the plurality of client apparatuses determined, without waiting for the request from any of the plurality of client apparatuses.

5. The information processing method according to claim 4, wherein a test print request source is printed in the test printing.

6. The information processing method according to claim 4, wherein a name of a server used in executing the test printing is printed in the test printing.

7. A computer-readable medium encoded with a control program for implementing an information processing method executed on an information processing apparatus in communication with a plurality of client apparatuses via a network, wherein the information processing method comprises:

determining whether a remote installation of a driver is to be performed on the plurality of client apparatuses to create a set-up instruction for the driver if it is determined that the remote installation is to be performed and determining a plurality of client apparatuses on which the driver is to be installed based on the set-up instruction;

designating, before the driver is installed, on a graphical user interface of an installer of the driver, whether test printing is to be executed after the driver installation has been correctly completed on the plurality of client apparatuses; and if the designation is made that the test printing is to be executed, controlling operations to transmit, without waiting for a request for the set-up instruction from any of the client apparatuses, to each of the plurality of client apparatuses determined, the driver, the set-up instruction to set up the driver, and a test printing instruction stored in the set-up instruction to execute test printing to check if the driver installation has been correctly completed on the plurality of client apparatuses, via the network, wherein, if the designation is made that the test printing is not to be executed, the operations are controlled to transmit the driver and the set-up instruction, but not the test printing instruction, to each of the plurality of client apparatuses determined, without waiting for the request from any of the plurality of client apparatuses.

8. The computer-readable medium according to claim 7, wherein a test print request source is printed in the test printing.

9. The computer-readable medium according to claim 7, wherein a name of a print server used in executing the test printing is printed in the test printing.

* * * * *